United States Patent
El-Khamy et al.

(10) Patent No.: US 10,599,974 B2
(45) Date of Patent: Mar. 24, 2020

(54) SYSTEM AND METHOD FOR INFORMATION HIGHWAYS IN A HYBRID FEEDFORWARD-RECURRENT DEEP NETWORK

(71) Applicant: Samsung Electronics Co., Ltd., Gyeonggi-do (KR)

(72) Inventors: Mostafa El-Khamy, San Diego, CA (US); Jungwon Lee, San Diego, CA (US); Jaeyoung Kim, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 650 days.

(21) Appl. No.: 15/343,882

(22) Filed: Nov. 4, 2016

(65) Prior Publication Data

US 2018/0060720 A1    Mar. 1, 2018

Related U.S. Application Data

(60) Provisional application No. 62/381,191, filed on Aug. 30, 2016.

(51) Int. Cl.
| | |
|---|---|
| *G06N 3/04* | (2006.01) |
| *G06N 3/063* | (2006.01) |
| *G06N 3/08* | (2006.01) |

(52) U.S. Cl.
CPC ............ *G06N 3/04* (2013.01); *G06N 3/0445* (2013.01); *G06N 3/0454* (2013.01); *G06N 3/063* (2013.01); *G06N 3/08* (2013.01)

(58) Field of Classification Search
CPC ...... G06N 3/04; G06N 3/0445; G06N 3/0454; G06N 3/0063; G06N 3/08
See application file for complete search history.

(56) References Cited

U.S. PATENT DOCUMENTS

| | | |
|---|---|---|
| 8,554,555 B2 | 10/2013 | Gruhn et al. |
| 9,400,955 B2 | 7/2016 | Garimella |

(Continued)

FOREIGN PATENT DOCUMENTS

WO    WO 2016/037351    3/2016

OTHER PUBLICATIONS

Colah's Blog, Understanding LSTM Networks, (2015), Github, p. 7. (https://colah.github.io/posts/2015-08-Understanding-LSTMs/) (Year: 2015).*

(Continued)

*Primary Examiner* — Robert A Cassity
*Assistant Examiner* — Ahsif A. Sheikh
(74) *Attorney, Agent, or Firm* — The Farrell Law Firm, P.C.

(57) ABSTRACT

An apparatus and a method. The apparatus includes a first recurrent network in a first layer; a second recurrent network in a second layer connected to the first recurrent network; a distant input gate connected to the second recurrent network; a first highway gate connected to the distant input gate and the second recurrent network; a first elementwise product projection gate connected to the distant input gate, the highway gate, and the second recurrent network; a second highway gate connected to the first recurrent network and the second recurrent network; and a second elementwise product projection gate connected to the first recurrent network, the second highway gate, and the second recurrent network.

20 Claims, 10 Drawing Sheets

(56) References Cited

U.S. PATENT DOCUMENTS

| | | |
|---|---|---|
| 9,401,148 B2 | 7/2016 | Lei et al. |
| 2003/0088529 A1* | 5/2003 | Klinker .................. H04L 45/00 706/3 |
| 2004/0059695 A1 | 3/2004 | Xiao et al. |
| 2007/0011639 A1* | 1/2007 | Pitts .................... G06F 17/5072 716/52 |
| 2014/0310218 A1 | 10/2014 | Min et al. |
| 2016/0093048 A1 | 3/2016 | Cheng et al. |

OTHER PUBLICATIONS

Zhang, Yu & Chen, Guoguo & Yu, Dong & Yao, Kaisheng & Khudanpur, Sanjeev & Glass, James. (2015). Highway Long Short-Term Memory RNNs for Distant Speech Recognition. (Year: 2015).*

Rafal Jozefowicz and Wojciech Zaremba and Ilya Sutskever, an Empirical Exploration of Recurrent Network Architectures, (2015), PLMR, pp. 2342-2350. (Year: 2015).*

* cited by examiner

SYSTEM AND METHOD FOR INFORMATION HIGHWAYS IN A HYBRID FEEDFORWARD-RECURRENT DEEP NETWORK

PRIORITY

This application claims priority under 35 U.S.C. § 119(e) to a U.S. Provisional Patent Application filed on Aug. 30, 2016 in the United States Patent and Trademark Office and assigned Ser. No. 62/381,191, the entire contents of which are incorporated herein by reference.

FIELD

The present disclosure relates generally to a system and a method for information highways in a deep neural network, and more particularly, to a system and a method for information highways in a hybrid feedforward-recurrent deep neural network.

BACKGROUND

A deep learning method is a type of machine learning method based on learning representations of data by using a deep graph with multiple processing layers. Such deep learning architectures include deep neural networks. A deep neural network (DNN) provides various functions such as image classification, speech recognition, and natural language processing. For example, Google's ALPHAGO™, a computer program for playing the board game "Go," based on a deep convolutional neural network (deep CNN or DCNN), recently defeated the human world champion of "Go," which suggests that complex tasks which were considered to be performed only by human beings can be solved by deep neural networks.

The depth of a neural network represents the number of successive layers in feedforward networks. A deeper neural network can better represent an input feature with lower complexity as compared to a shallow neural network. However, training deep networks is difficult due to vanishing/exploding gradient problems, and existing optimization solvers often fail with an increasing number of layers. Furthermore, the increasing depth of recurrent architectures like a gated recurrent unit (GRU) and long short term memories (LSTM) makes training of recurrent neural network (RNN) architectures more difficult because these architectures already have very deep representations in a temporal domain that may further aggravate vanishing/exploding gradient issues.

SUMMARY

According to one embodiment, an apparatus includes a first recurrent network in a first layer; a second recurrent network in a second layer connected to the first recurrent network; a distant input gate connected to the second recurrent network; a first highway gate connected to the distant input gate and the second recurrent network; a first elementwise product projection gate connected to the distant input gate, the first highway gate, and the second recurrent network; a second highway gate connected to the first recurrent network and the second recurrent network; and a second elementwise product projection gate connected to the first recurrent network, the second highway gate, and the second recurrent network.

According to one embodiment, a method of a hybrid recurrent network with a highway connection includes feeding an output from a first recurrent network in a first layer to a second recurrent network in a second layer via a first highway gate for the highway connection; and receiving a distant input in the second recurrent network via a distant input gate and a second highway gate.

According to one embodiment, an apparatus includes a first recurrent network in a first layer; a second recurrent network in a second layer connected to the first recurrent network; a third recurrent network in a second layer connected to the second recurrent network; a distant input gate in the third recurrent network connected to the first recurrent network; a first highway gate in the third recurrent network connected to the distant input gate; a second highway gate in the third recurrent network connected to the second recurrent network; and a first elementwise product projection gate in the third recurrent network connected to the second recurrent network and the second highway gate.

According to one embodiment, a method of a hybrid recurrent network with multiple highway connections includes feeding an output from a second recurrent network in a second layer to a third recurrent network in a third layer via a first highway gate for the highway connection; and receiving a distant input in the third recurrent network from a first recurrent network in a first layer via a distant input gate and a second highway gate.

According to one embodiment, a method of manufacturing a hybrid recurrent network with a highway connection includes forming the hybrid recurrent network with the highway connection as part of a wafer or package that includes at least one other hybrid recurrent network with a highway connection, wherein the hybrid recurrent network with a highway connection is configured to feed an output from a first recurrent network in a first layer to a second recurrent network in a second layer via a first highway gate for the highway connection, and receive a distant input in the second recurrent network via a distant input gate and a second highway gate; and testing the hybrid recurrent network with the highway connection, wherein testing the hybrid recurrent network with the highway connection comprises testing the hybrid recurrent network with the highway connection and the at least one other hybrid recurrent network with the highway connection using one or more electrical to optical converters, one or more optical splitters that split an optical signal into two or more optical signals, and one or more optical to electrical converters.

According to one embodiment, a method of constructing an integrated circuit includes generating a mask layout for a set of features for a layer of the integrated circuit, wherein the mask layout includes standard cell library macros for one or more circuit features that include a hybrid recurrent network with a highway connection configured to feed an output from a first recurrent network in a first layer to a second recurrent network in a second layer via a first highway gate for the highway connection, and receive a distant input in the second recurrent network via a distant input gate and a second highway gate; disregarding relative positions of the macros for compliance to layout design rules during the generation of the mask layout; checking the relative positions of the macros for compliance to layout design rules after generating the mask layout; upon detection of noncompliance with the layout design rules by any of the macros, modifying the mask layout by modifying each of the noncompliant macros to comply with the layout design rules; generating a mask according to the modified mask layout with the set of features for the layer of the integrated circuit; and manufacturing the integrated circuit layer according to the mask.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
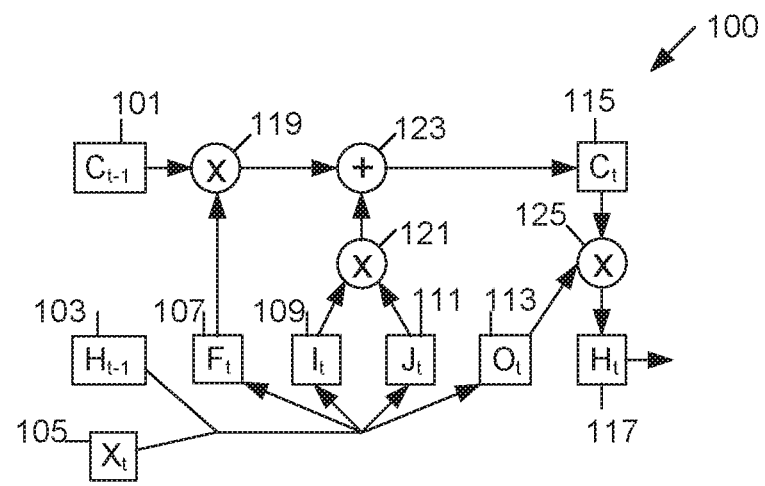
FIG. 1 is a block diagram of an LSTM network architecture.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope and spirit of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the spirit and the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Such terms as those defined in a generally used dictionary are to be interpreted to have the same meanings as the contextual meanings in the relevant field of art, and are not to be interpreted to have ideal or excessively formal meanings unless clearly defined in the present disclosure.

The present disclosure is related to a system and method for information highways in a hybrid feedforward-recurrent deep neural network. An embodiment of the present disclosure overcomes gradient vanishing/explosion issues on recurrent and hybrid neural networks. The present disclosure provides information flows in very deep neural networks that have both feedforward (fully connected or convolutional) and RNNs. RNNs may be implemented as GRUs and/or LSTMs that control the flow of information into and from a recurrent unit.

According to one embodiment, the present disclosure provides multiple highway connections from multiple inputs coming from different types of layers.

According to one embodiment, the present disclosure provides an LSTM architecture (e.g., $H^2$LSTM) that includes highway gates that may pass information from previous LSTM layers, as well as distant layers such as prior convolutional layers or a distant input layer, where a distant input need not be from another recurrent network.

A highway connection that is relatively farther away may help to avoid gradient vanishing/explosion issues. This is especially useful for a hybrid neural network, because a highway connection from different components may be fed back directly.

The present disclosure provides accurate learning of a desired function as a network may learn a simplified function of an old input by driving weights of extra deep layers to zero.

An inter highway GRU (HGRU) may further provide highway connections from previous, or lower, GRU layers rather than within one GRU layer in combined, or stacked, GRU networks.

In an embodiment of the present disclosure, a GRU architecture (e.g., H²GRU) incorporates a modified HGRU architecture in hybrid networks with a highway gate for controlling the passage of information from distant layers into the HGRU state.

According to one embodiment, an RNN may be described in Equation (1) as follows:

$$h_t = g(W_{hh}h_{t-1}W_{xh}x_t) \quad (1)$$

where g is a non linear function, $x_t$ is an input, and $W_{hh}$ and $W_{xh}$ are weight matrices.

FIG. 1 is a block diagram of an LSTM network architecture 100.

Referring to FIG. 1, the LSTM network architecture 100 in a layer (e.g., layer L+1) includes a first cell activation register $c_{t-1}^{L+1}$ 101 to hold the cell activation of a previous layer (e.g., layer L), a first output gate $h_{t-1}^{L+1}$ 103 to hold the output of a previous layer, an input register $x_t^{L+1}$ 105, a forget gate $f_t^{L+1}$ 107, an input gate $i_t^{L+1}$ 109, a new input register $j_t^{L+1}$ 111, a cell output activation register $o_t^{L+1}$ 113, a second cell activation register $c_t^{L+1}$ 115, and a second output gate $h_t^{L+1}$ 117.

The first cell activation register $c_{t-1}^{L+1}$ 101 includes an output connected to a first input of a first elementwise product projection gate 119, where the first elementwise product projection gate 119 includes a second input and an output. The first output gate $h_{t-1}^{L+1}$ 103 includes an output connected to an input of each of the forget gate $f_t^{L+1}$ 107, the input gate $i_t^{L+1}$ 109, the new input register $j_t^{L+1}$ 111, and the cell output activation register $o_t^{L+1}$ 113. The input register $x_t^{L+1}$ 105 includes an output connected to the inputs of each of the forget gate $f_t^{L+1}$ 107, the input gate $i_t^{L+1}$ 109, the new input register $j_t^{L+1}$ 111, and the cell output activation register $o_t^{L+1}$ 113. The forget gate $f_t^{L+1}$ 107 includes an output connected to the second input of the first elementwise product projection gate 119. The input gate $i_t^{L+1}$ 109 includes an output connected to a first input of a second elementwise product projection gate 121, where the second elementwise product projection gate 121 includes a second input and an output. The new input register $j_t^{L+1}$ 111 includes an output connected to the second input of the second elementwise product projection gate 121. The cell output activation register $o_t^{L+1}$ 113 includes an output connected to a first input of a third elementwise product projection gate 125, where the third elementwise product projection gate includes a second input and an output. A elementwise adder 123 includes a first input connected to the output of the first elementwise product projection gate 119, a second input connected to the output of the second elementwise product projection gate 121, and an output. The second cell activation register $c_t^{L+1}$ 115 includes an input connected to the output of the elementwise adder 123 and an output connected to the second input of the elementwise product projection gate 125. The second output gate $h_t^{L+1}$ 117 includes an input connected to the output of the third elementwise product projection gate 125 and an output.

The forget gate $f_t^{L+1}$ 107, the input gate $i_t^{L+1}$ 109, the new input register $j_t^{L+1}$ 111, the cell output activation register $o_t^{L+1}$ 113, the second cell activation $c_t^{L+1}$ 115, and the second output gate $h_t^{L+1}$ 117, which may each be represented in Equations (2)-(7) as follows, where ⊙ represents an elementwise product:

$$f_t^{L+1} = \text{sigm}(W_{xf}^{L+1}x_t^{L+1} + W_{hf}^{L+1}h_{t-1}^{L+1} + W_{cf}^{L+1}c_{t-1}^{L+1} + b_f^{L+1}) \quad (2)$$

$$i_t^{L+1} = \text{sigm}(W_{xi}^{L+1}x_t^{L+1} + W_{hi}^{L+1}h_{t-1}^{L+1} + W_{ci}^{L+1}c_{t-1}^{L+1} + b_i^{L+1}) \quad (3)$$

$$j_t^{L+1} = \tanh(W_{xc}^{L+1}x_t^{L+1} + W_{hc}^{L+1}h_{t-1}^{L+1} + b_j^{L+1}) \quad (4)$$

$$o_t^{L+1} = \text{sigm}(W_{xo}^{L+1}x_t^{L+1} + W_{ho}^{L+1}h_{t-1}^{L+1} + W_{co}^{L+1}c_t^{L+1} + b_o^{L+1}) \quad (5)$$

$$c_t^{L+1} = f_t^{L+1} \odot c_{t-1}^{L+1} + i_t^{L+1} \odot j_t^{L+1} \quad (6)$$

$$h_t^{L+1} = o_t^{L+1} \odot \tanh(c_t^{L+1}). \quad (7)$$

The input gate $i_t^{L+1}$ 109 controls how much information from the new input register $j_t^{L+1}$ 111 is read. The forget gate $f_t^{L+1}$ 107 controls how much information from the first cell activation register $c_{t-1}^{L+1}$ 101 is forgotten. The projection layers may be neglected or added.

According to one embodiment, the LSTM network architecture has no peephole connections and gates do not depend on c, and sigm and tanh may be interchanged as in Equations (8)-(13) as follows:

$$i_t^{L+1} = \tanh(W_{xi}^{L+1}x_t^{L+1} + W_{hi}^{L+1}h_{t-1}^{L+1} + b_i^{L+1}) \quad (8)$$

$$f_t^{L+1} = \text{sigm}(W_{xf}^{L+1}x_t^{L+1} + W_{hf}^{L+1}h_{t-1}^{L+1} + b_f^{L+1}) \quad (9)$$

$$j_t^{L+1} = \text{sigm}(W_{xc}^{L+1}x_t^{L+1} + W_{hc}^{L+1}h_{t-1}^{L+1} + b_j^{L+1}) \quad (10)$$

$$c_t^{L+1} = f_t^{L+1} \odot c_{t-1}^{L+1} + i_t^{L+1} \odot j_t^{L+1} \quad (11)$$

$$o_t^{L+1} = \tanh(W_{xo}^{L+1}x_t^{L+1} + W_{ho}^{L+1}h_{t-1}^{L+1} + b_o^{L+1}) \quad (12)$$

$$h_t^{L+1} = o_t^{L+1} \odot \tanh(c_t^{L+1}). \quad (13)$$

Stacked LSTM layers may be considered as in Equation (14) as follows:

$$x_t^{L+1} = h_t^L. \quad (14)$$

A highway, or depth, gate $d_t^{L+1}$ connects a first memory cell in a lower layer L with a second memory cell in an upper layer L+1, and controls information that can flow directly as in Equations (15)-17) as follows:

$$x_t^{L+1} = h_t^L \quad (15)$$

$$d_t^{L+1} = s(b_d^{L+1} + W_{xd}^{L+1}x_t^{L+1} + w_{cd}^{L+1} \odot c_{t-1}^{L+1} + w_{ld}^{L+1} \odot c_t^L) \quad (16)$$

$$c_t^{L+1} = d_t^{L+1} \odot c_t^L + f_t^{L+1} \odot c_{t-1}^{L+1} + i_t^{L+1} \odot j_t^{L+1}. \quad (17)$$

According to one embodiment, the present system and method must pass and control information from an extra input. The extra input $p_t^{L*}$ may be a much distant $h_t^{L-1}$ from another LSTM or an intermediate output after another subnetwork before the LSTM layers as CNN layers, or an initial input to the network.

According to one embodiment, a stacked DNN/CNN and an LSTM network may be combined.

Figure 2:
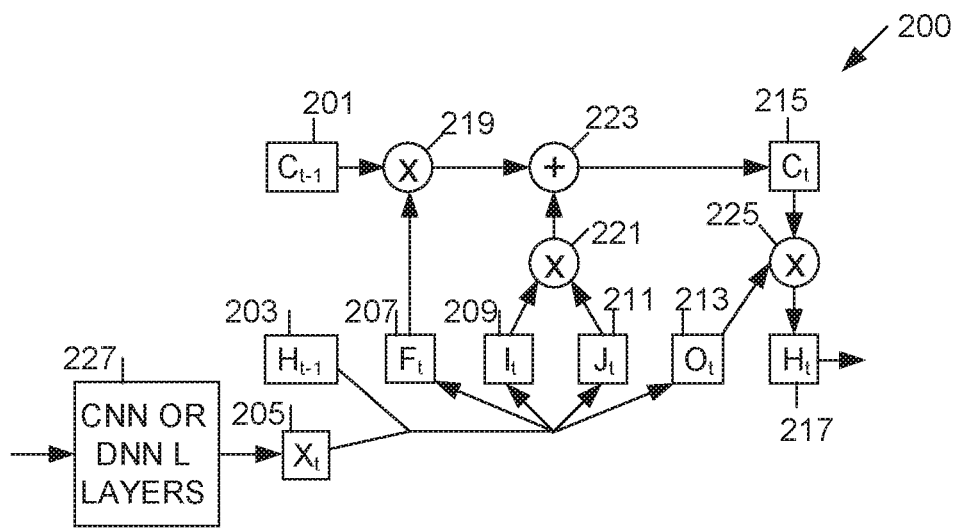
FIG. 2 is a block diagram of a combined CNN, or DNN, and LSTM network architecture (CNN/DNN-LSTM)

FIG. 2 is a block diagram of a combined CNN, or DNN, and LSTM network architecture (CNN/DNN-LSTM) 200.

Referring to FIG. 2, the CNN/DNN-LSTM 200 in a layer (e.g., layer L+1) includes a first cell activation register $c_{t-1}^{L+1}$ 201 to hold the cell activation of a previous layer (e.g., layer L), a first output gate $h_{t-1}^{L+1}$ 203 to hold the output of a previous layer, an input register $x_t^{L+1}$ 205, a forget gate $f_t^{L+1}$ 207, an input gate $i_t^{L+1}$ 209, a new input register $j_t^{L+1}$ 211, a cell output activation register $o_t^{L+1}$ 213, a second cell activation register $c_t^{L+1}$ 215, a second output gate $h_t^{L+1}$ 217, and a CNN or DNN 227.

The first cell activation register $c_{t-1}^{L+1}$ 201 includes an output connected to a first input of an elementwise product projection gate 219, where the first elementwise product projection gate 219 includes a second input and an output. The first output gate $h_{t-1}^{L+1}$ 203 includes an output connected to an input of each of the forget gate $f_t^{L+1}$ 207, the input gate $i_t^{L+1}$ 209, the new input register $j_t^{L+1}$ 211, and the cell output activation register $o_t^{L+1}$ 213. The input register $x_t^{L+1}$ 205 includes an output connected to the inputs of each of the forget gate $f_t^{L+1}$ 207, the input gate $i_t^{L+1}$ 209, the new input register $j_t^{L+1}$ 211, and the cell output activation register $o_t^{L+1}$ 213. The forget gate $f_t^{L+1}$ 207 includes an output connected to the second input of the first elementwise product projection gate 219. The input gate $i_t^{L+1}$ 209 includes an output connected to a first input of a second elementwise product projection gate 221, where the second elementwise product projection gate 221 includes a second input and an output. The new input register $j_t^{L+1}$ 211 includes an output connected to the second input of the second elementwise product projection gate 221. The cell output activation register $o_t^{L+1}$ 213 includes an output connected to a first input of a third elementwise product projection gate 225, where the third elementwise product projection gate 225 includes a second input and an output. A elementwise adder 223 includes a first input connected to the output of the first elementwise product projection gate 219, a second input connected to the output of the second elementwise product projection gate 221, and an output. The second cell activation register $c_t^{L+1}$ 215 includes an input connected to the output of the elementwise adder 223 and an output connected to the second input of the third elementwise product projection gate 225. The second output gate $h_t^{L+1}$ 217 includes an input connected to the output of the third elementwise product projection gate 225 and an output. The CNN or DNN 227 includes an input, and an output connected to an input of the input register $x_t^{L+1}$ 205.

The LSTM may stacked at layer L+1, with a previous output from a DNN/CNN 227 at layer L called $p_t^L$, then the input register 205 is as in Equation (18) as follows:

$$x_t^{L+1}=p_t^L. \quad (18)$$

According to one embodiment, a hybrid DNN/CNN with LSTM networks and residual connection may be combined.

Figure 3:
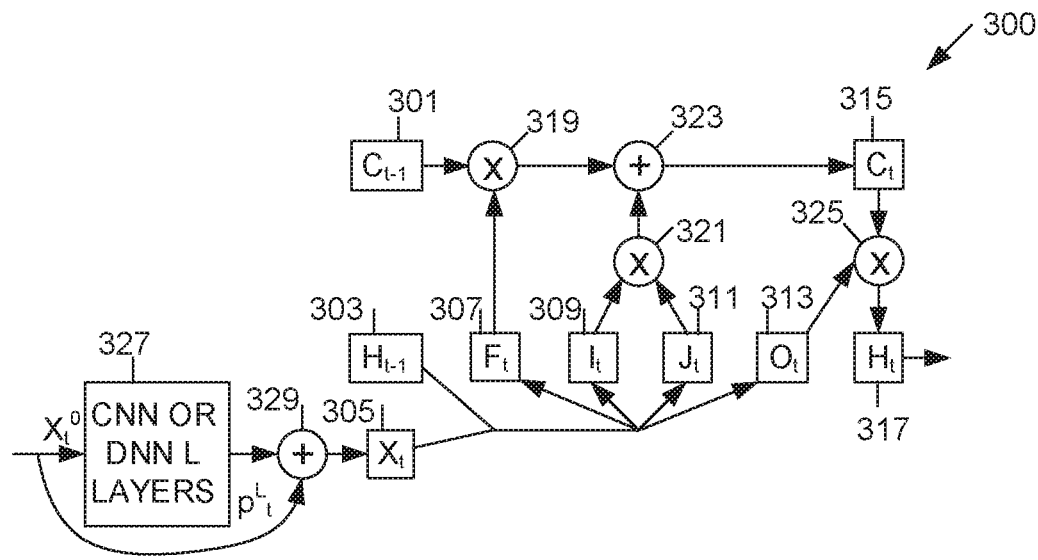
FIG. 3 is a block diagram of a combined hybrid CNN, or hybrid DNN, and LSTM network architecture (hybrid CNN/DNN-LSTM)

FIG. 3 is a block diagram of a combined hybrid CNN, or hybrid DNN, and LSTM network architecture (hybrid CNN/DNN-LSTM) 300. FIG. 3 combines a hybrid DNN/CNN with LSTM networks and a residual connection. A residual network may initially be developed for a feedforward network with no LSTM. A desired distant input $p_t^{L*}$ uses $x_t^0$ as an auxiliary input to the network 300, as shown in FIG. 3.

Referring to FIG. 3, the hybrid CNN/DNN-LSTM 300 in a layer (e.g., layer L+1) includes a first cell activation register $c_{t-1}^{L+1}$ 301 to hold the cell activation of a previous layer (e.g., layer L), a first output gate $h_{t-1}^{L+1}$ 303 to hold the output of a previous layer, an input register $x_t^{L+1}$ 305, a forget gate $f_t^{L+1}$ 307, an input gate $i_t^{L+1}$ 309, a new input register $j_t^{L+1}$ 311, a cell output activation register $o_t^{L+1}$ 313, a second cell activation register $c_t^{L+1}$ 315, a second output gate $h_t^{L+1}$ 317, and CNN or DNN 327.

The first cell activation register $c_{t-1}^{L+1}$ 301 includes an output connected to a first input of an elementwise product projection gate 319, where the first elementwise product projection gate 319 includes a second input and an output. The first output gate $h_{t-1}^{L+1}$ 303 includes an output connected to an input of each of the forget gate $f_t^{L+1}$ 307, the input gate $i_t^{L+1}$ 309, the new input register $j_t^{L+1}$ 311, and the cell output activation register $o_t^{L+1}$ 313. The input register $x_t^{L+1}$ 305 includes an output connected to the inputs of each of the forget gate $f_t^{L+1}$ 307, the input gate $i_t^{L+1}$ 309, the new input register $j_t^{L+1}$ 311, and the cell output activation register $o_t^{L+1}$ 313. The forget gate $f_t^{L+1}$ 307 includes an output connected to the second input of the first elementwise product projection gate 319. The input gate $i_t^{L+1}$ 309 includes an output connected to a first input of a second elementwise product projection gate 321, where the second elementwise product projection gate 321 includes a second input and an output. The new input register $j_t^{L+1}$ 311 includes an output connected to the second input of the second elementwise product projection gate 321. The cell output activation register $o_t^{L+1}$ 313 includes an output connected to a first input of a third elementwise product projection gate 325, where the third elementwise product projection gate 325 includes a second input and an output. A first elementwise adder 323 includes a first input connected to the output of the first elementwise product projection gate 319, a second input connected to the output of the second elementwise product projection gate 321, and an output. The second cell activation register $c_t^{L+1}$ 315 includes an input connected to the output of the first elementwise adder 323 and an output connected to the second input of the third elementwise product projection gate 325. The second output gate $h_t^{L+1}$ 317 includes an input connected to the output of the third elementwise product projection gate 325 and an output. The CNN or DNN 327 includes an input connected to a first input of a second elementwise adder 329, and an output connected to a second input of the second elementwise adder 329, where the second elementwise adder 329 includes an output connected to an input of the input register $x_t^{L+1}$ 305.

The CNN or DNN 327 is trained to learn $H-p_t^{L*}$, where H is the desired function. A shortcut connection is simply added is as in Equation (19) as follows such that:

$$x_t^{L+1}=p_t^L+p_t^{L*}, \quad (19)$$

where $p_t^{L*}$ is the distant input which can be from the initial input, or an output from another network which can be CNN or DNN, or an output of another recurrent layer.

Figure 4:
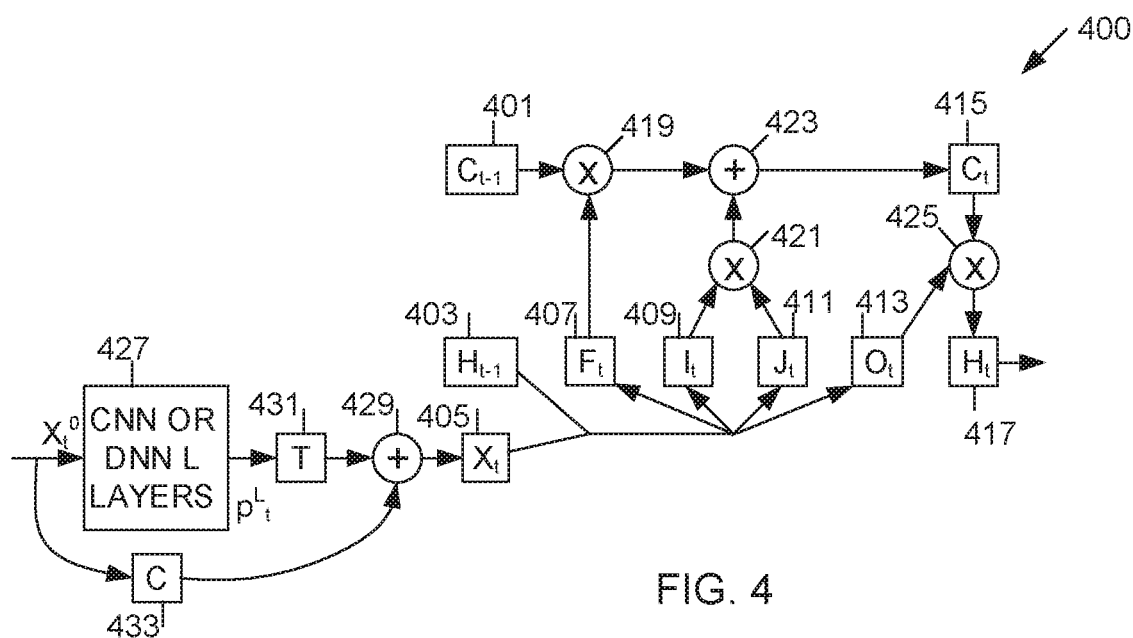
FIG. 4 is a block diagram of a combined hybrid CNN, or hybrid DNN, and LSTM network architecture with a highway connection (hybrid CNN/DNN-HLSTM)

FIG. 4 is a block diagram of a combined hybrid CNN, or hybrid DNN, and LSTM network architecture with a highway connection (hybrid CNN/DNN-HLSTM) 400. A highway network may be initially developed for a simple feedforward network with no LSTM. A distant input $p_t^{L*}$ may be $x_t^0$, an initial input to the hybrid CNN/DNN-HLSTM 400.

Referring to FIG. 4, the hybrid CNN/DNN-HLSTM 400 in a layer (e.g., layer L+1) includes a first cell activation register $c_{t-1}^{L+1}$ 401 to hold the cell activation of a previous layer (e.g., layer L), a first output gate $h_{t-1}^{L+1}$ 403 to hold the output of a previous layer, an input register $x_t^{L+1}$ 405, a forget gate $f_t^{L+1}$ 407, an input gate $i_t^{L+1}$ 409, a new input register $j_t^{L+1}$ 411, a cell output activation register $o_t^{L+1}$ 413, a second cell activation register $c_t^{L+1}$ 415, a second output gate $h_t^{L+1}$ 417, a CNN or a DNN 427, a highway gate T 431, and a highway gate C 433.

The first cell activation register $c_{t-1}^{L+1}$ 401 includes an output connected to a first input of an elementwise product projection gate 419, where the first elementwise product projection gate 419 includes a second input and an output. The first output gate $h_{t-1}^{L+1}$ 403 includes an output connected to an input of each of the forget gate $f_t^{L+1}$ 407, the input gate $i_t^{L+1}$ 409, the new input register $j_t^{L+1}$ 411, and the cell output activation register $o_t^{L+1}$ 413. The input register $x_t^{L+1}$ 405 includes an output connected to the inputs of each of the forget gate $f_t^{L+1}$ 407, the input gate $i_t^{L+1}$ 409, the new input register $j_t^{L+1}$ 411, and the cell output activation register $o_t^{L+1}$ 413. The forget gate $f_t^{L+1}$ 407 includes an output connected to the second input of the first elementwise product projection gate 419. The input gate $i_t^{L+1}$ 409 includes an output connected to a first input of a second elementwise product projection gate 421, where the second elementwise product projection gate 421 includes a second input and an output. The new input register $j_t^{L+1}$ 411 includes an output connected to the second input of the second elementwise product projection gate 421. The cell output activation register $o_t^{L+1}$ 413 includes an output connected to a first input of a third elementwise product projection gate 425, where the third elementwise product projection gate 425 includes a second input and an output. A first elementwise adder 423 includes a first input connected to the output of the first elementwise product projection gate 419, a second input connected to the output of the second elementwise product projection gate 421, and an output. The second cell activation register $c_t^{L+1}$ 415 includes an input connected to the output of the first elementwise adder 423 and an output connected to the second input of the third elementwise product projection gate 425. The second output gate $h_t^{L+1}$ 417 includes an input connected to the output of the third elementwise product projection gate 425 and an output. The CNN or DNN 427 includes an input connected to an input of the highway gate C 433, and an output, where the highway gate C 433 includes an output connected to a first input of a second elementwise adder 429. The highway gate T 431 includes an input connected to the output of the CNN or DNN 427 and an output connected to a second input of the second elementwise adder 429, where the second elementwise adder 429 includes an output connected to an input of the input register $x_t^{L+1}$ 405.

For the hybrid CNN/DNN-HLSTM 400, the initial input $x_t^0$ is passed through a highway gate at the input of the desired LSTM layer as in Equations (20) and (21) as follows:

$$x_t^{L+1} = x_t^0 \cdot C(x, W_C) + p_t^L \cdot T(x, W_T) \quad (20)$$

$$T(x, W_T) = s(W_T x + b_T); \ C(x, W_C) = 1 - T(x, W_T), \quad (21)$$

where $b_T$ is initialized towards a negative value so that the network is biased towards carry over, in highway networks.

Figure 5:
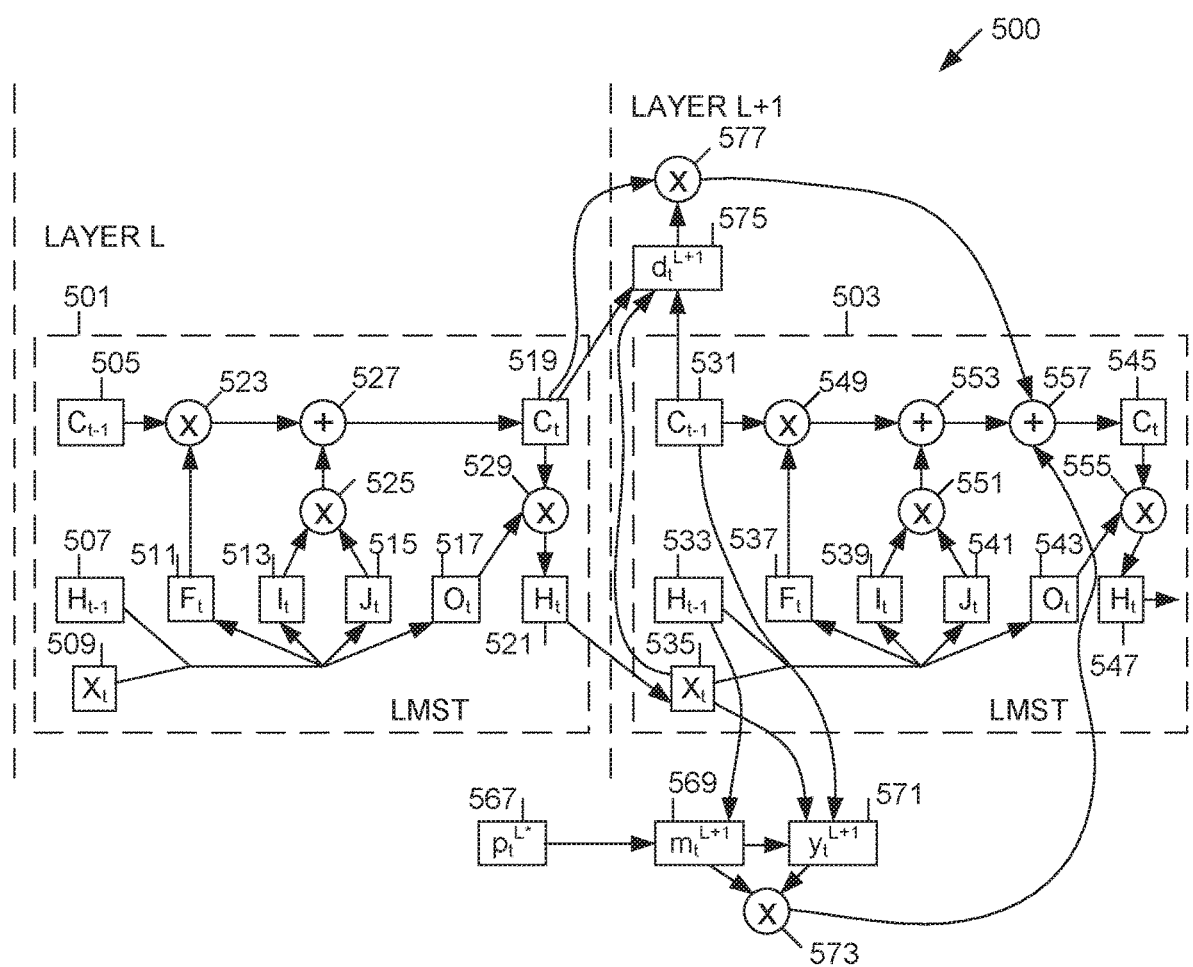
FIG. 5 is a block diagram of a hybrid LSTM network architecture with highway connections ($H^2$LSTM), according to an embodiment of the present disclosure.

FIG. 5 is a block diagram of a hybrid LSTM network architecture with highway connections (H²LSTM) 500, according to an embodiment of the present disclosure.

Referring to FIG. 5, the H²LSTM 500 in a first layer (e.g., layer L) includes a first cell activation register $c_{t-1}^L$ 505 to hold the cell activation of a previous layer (e.g., layer L−1), a first output gate $h_{t-1}^L$ 507 to hold the output of a previous layer, an input register $x_t^L$ 509, a forget gate $f_t^L$ 511, an input gate $i_t^L$ 513, a new input register $j_t^L$ 515, a cell output activation register $o_t^L$ 517, a second cell activation register $c_t^L$ 519, and a second output gate $h_t^L$ 521.

The first cell activation register $c_{t-1}^L$ 505 includes an output connected to a first input of a first elementwise product projection gate 523, where the first elementwise product projection gate 523 includes a second input and an output. The first output gate $h_{t-1}^L$ 507 includes an output connected to an input of each of the forget gate $f_t^L$ 511, the input gate $i_t^L$ 513, the new input register $j_t^L$ 515, and the cell output activation register $o_t^L$ 517. The input register $x_t^L$ 509 includes an output connected to the inputs of each of the forget gate $f_t^L$ 511, the input gate $i_t^L$ 513, the new input register $j_t^L$ 515, and the cell output activation register $o_t^L$ 517. The forget gate $f_t^L$ 511 includes an output connected to the second input of the first elementwise product projection gate 523. The input gate $i_t^L$ 513 includes an output connected to a first input of a second elementwise product projection gate 525, where the second elementwise product projection gate 525 includes a second input and an output. The new input register $j_t^L$ 515 includes an output connected to the second input of the second elementwise product projection gate 525. The cell output activation register $o_t^L$ 517 includes an output connected to a first input of a third elementwise product projection gate 529, where the third elementwise product projection gate 529 includes a second input and an output. A elementwise adder 527 includes a first input connected to the output of the first elementwise product projection gate 523, a second input connected to the output of the second elementwise product projection gate 525, and an output. The second cell activation register $c_t^L$ 519 includes an input connected to the output of the elementwise adder 527 and an output connected to the second input of the third elementwise product projection gate 529. The second output gate $h_t^L$ 521 includes an input connected to the output of the third-elementwise product projection gate 529 and an output.

The H²LSTM 500 in a second layer (e.g., layer L+1) includes a first cell activation register $c_{t-1}^{L+1}$ 531 to hold the cell activation of a previous layer (e.g., layer L), a first output gate $h_{t-1}^{L+1}$ 533 to hold the output of a previous layer, an input register $x_t^{L+1}$ 535, a forget gate $f_t^{L+1}$ 537, an input gate $i_t^{L+1}$ 539, a new input register $j_t^{L+1}$ 541, a cell output activation register $o_t^{L+1}$ 543, a second cell activation register $c_t^{L+1}$ 545, a second output gate $h_t^{L+1}$ 547, a distant signal register 567, an additional RNN operation block 569, a first highway gate 571, and a second highway gate 575.

The first cell activation register $c_{t-1}^{L+1}$ 531 of the second layer includes a first output connected to a first input of a first elementwise product projection gate 549, a second output connected to a first input of the first highway gate 571, and a third output connected to a first input of the second highway gate 575, where the first elementwise product projection gate 549 includes a second input and an output. The first output gate $h_{t-1}^{L+1}$ 533 includes a first output connected to an input of each of the forget gate $f_t^{L+1}$ 537, the input gate $i_t^{L+1}$ 539, the new input register $j_t^{L+1}$ 541, and the cell output activation register $o_t^{L+1}$ 543, and a second output connected to a first input of the additional RNN operation block 569. The input register $x_t^{L+1}$ 535 includes an input connected to the output of the second output gate $h_t^L$ 521 of the first layer, a first output connected to the inputs of each of the forget gate $f_t^{L+1}$ 537, the input gate $i_t^{L+1}$ 539, the new input register $j_t^{L+1}$ 541, and the cell output activation register $o_t^{L+1}$ 543, a second output connected to a second input of the first highway gate 571, and a third output connected to a second input of the second highway gate 575. The forget gate $f_t^{L+1}$ 537 includes an output connected to the second input of the first elementwise product projection gate 549. The input gate $i_t^{L+1}$ 539 includes an output connected to a first input of a second elementwise product projection gate 551, where the second elementwise product projection gate 551 includes a second input and an output. The new input register $j_t^{L+1}$ 541 includes an output connected to the second input of the second elementwise product projection gate 551. The cell output activation register $o_t^{L+1}$ 543 includes an output connected to a first input of a third elementwise product projection gate 555, where the third elementwise product projection gate 555 includes a second input and an output. A first elementwise adder 553 includes a first input connected to the output of the first elementwise product projection gate 549, a second input connected to the output of the second elementwise product projection gate 551, and an output. A second elementwise adder 557 includes a first input connected to the output of the first elementwise adder 553, a second input connected to an output of a fourth elementwise product projection gate 573, a third input, and an output, where the fourth elementwise product projection gate 573 includes a first input and a second input. The second cell activation register $c_t^{L+1}$ 545 includes an input connected to the output of the second elementwise adder 557 and an output connected to second input of the third elementwise product projection gate 555. The second output gate $h_t^{L+1}$ 547 includes an input connected to the output of the third elementwise product projection gate 555 and an output. The distant signal register 567 includes an output connected to an input of the additional RNN operation block 569. The additional RNN operation block 569 includes a first output connected to a third input of the first highway gate 571, and a second output connected to a first input of a fourth elementwise product projection gate 573. The first highway gate 571 includes an output connected to a second input of the fourth elementwise product projection gate 573, where the fourth elementwise product projection gate 573 includes an output connected to the second input of the second elementwise adder 557. The second highway gate 575 includes a third input connected to a second output of the second cell activation register $c_t^L$ 519 of the first layer, and an output connected to a first input of a fifth elementwise product projection gate 577, where the fifth elementwise product projection gate 577 includes a second input connected to a third output of the second cell activation register $c_t^L$ 519 of the first layer, and an output connected to the third input of the second elementwise adder 557.

The H²LSTM 500 network architecture includes a new highway gate that may feed directly into an LSTM cell at layer L+k as in Equations (22) and (23) as follows:

$$x_t^{L+1} = h_t^L \tag{22}$$

$$d_t^{L+k} = s(b_d^{L+k} + W_{xd}^{L+k} x_t^{L+k} + w_{cd}^{L+k} \odot c_{t-1}^{L+k} + w_{ld}^{L+k} \odot c_t^{L+k}), \tag{23}$$

where $d_t^{L+k}$ is a highway, or depth, gate for highway connection from a previous LSTM layer.

There is an additional RNN operation block 569 as a function of a previous output and an additional input as in Equation (24) as follows:

$$m_t^{L+k} = s(W_{pm}^{L+k} p_t^{L*} + W_{hm}^{L+k} h_{t-1}^{L+k} + b_m^{L+k}), \tag{24}$$

where $m_t^{L+k}$ is an additional input as a function of a highway input and a previous layer's LSTM output. The sigmoid (s) function may be replaced with tanh or rectified linear unit (RELU). $W_{pm}^{L+k}$ serves to project p into the cell dimension, at level L+k.

The highway gate for a distant signal $p_t^{L*}$ may be represented as follows:

$$y_t^{L+k} = s(b_y^{L+k} + W_{xy}^{L+k} x_t^{L+k} + w_{cy}^{L+k} \odot c_{t-1}^{L+k} + w_{my}^{L+k} \odot m_t^{L+k}), \tag{25}$$

where $y_t^{L+k}$ is the first highway gate 571 for an additional shortcut connection.

In an embodiment of the present system and method, $p_t^{L*}$ may be an initial input $x_t^0$. Alternatively, the first highway gate 571 may be calculated based on $p_t^{L*}$ directly as in Equation (26) follows:

$$y_t^{L+k} = s(b_y^{L+k} + W_{xy}^{L+k} x_t^{L+k} + w_{cy}^{L+k} \odot c_{t-1}^{L+k} + W_{py}^{L+k} p_t^{L*}). \tag{26}$$

The second and final cell state $c_t^{L+k}$ 545 is a weighted combination of the first cell state $c_{t-1}^{L+k}$ 531 from the first layer through the forget state $f_t^{L+k}$ 537, an RNN with current LSTM input $j_t^{L+k}$ 541 through an input gate $i_t^{L+k}$ 539, a cell state of lower layer LSTM in the second $c_t^{L+k-1}$ 519 of the first layer through the second highway gate, or highway, or depth, gate, $d_t^{L+k}$ 575, a distant signal register 567 as lower layer sub-network output from additional RNN operation block $m_t^{L+k}$ 569 or initial input through the first highway gate $y_t^{L+k}$ 571 as in Equation (27) as follows:

$$c_t^{L+k} = f_t^{L+k} \odot c_{t-1}^{L+k} + i_t^{L+k} \odot j_t^{L+k} + d_t^{L+k} \odot c_t^{L+k-1} + y_t^{L+k} \odot m_t^{L+k}. \tag{27}$$

The final cell state $c_t^{L+k}$ 545 takes information regarding $p_t^{L*}$ indirectly through the additional RNN operation block 569 that calculates $m_t^{L+k}$ via the first highway gate 571 that calculates gate $y_t^{L+k}$.

According to one embodiment of the present system an method, the LSTM layer to which the additional input is passed may be modified as in Equation (28)-(36) as follows:

$$x_t^{L+1} = h_t^L \tag{28}$$

$$i_t^{L+1} = \tanh(W_{xi}^{L+1} x_t^{L+1} + W_{hi}^{L+1} h_{t-1}^{L+1} + b_i^{L+1}) \tag{29}$$

$$f_t^{L+1} = \text{sigm}(W_{xf}^{L+1} x_t^{L+1} + W_{hf}^{L+1} h_{t-1}^{L+1} + b_f^{L+1}) \tag{30}$$

$$j_t^{L+1} = \text{sigm}(W_{xc}^{L+1} x_t^{L+1} + W_{hc}^{L+1} h_{t-1}^{L+1} + b_j^{L+1}) \tag{31}$$

$$o_t^{L+1} = \tanh(W_{xo}^{L+1} x_t^{L+1} + W_{ho}^{L+1} h_{t-1}^{L+1} + b_o^{L+1}) \tag{32}$$

$$d_t^{L+1} = \text{sigm}(b_d^{L+1} + W_{xd}^{L+1} x_t^{L+1} + w_{cd}^{L+1} \odot c_{t-1}^{L+1} + w_{ld}^{L+1} \odot c_t^L) \tag{33}$$

$$m_t^{L+1} = \text{sigm}(W_{pm}^{L+1} p_t^L + W_{hm}^{L+1} h_{t-1}^{L+1} + b_m^{L+1}) \tag{34}$$

$$y_t^{L+1} = \text{sigm}(b_y^{L+1} + W_{xy}^{L+1} x_t^{L+1} + w_{cy}^{L+1} \odot c_{t-1}^{L+1} + w_{my}^{L+1} \odot m_t^{L+1}) \tag{35}$$

$$c_t^{L+1} = f_t^{L+1} \odot c_{t-1}^{L+1} + i_t^{L+1} \odot j_t^{L+1} + d_t^{L+1} \odot c_t^L + y_t^{L+1} \odot m_t^{L+1} \tag{36}$$

$$h_t^{L+1} = o_t^{L+1} \odot \tanh(c_t^{L+1}). \tag{37}$$

According to one embodiment of the present system and method, if there are multiple additional inputs, P of $p_t^{L*}$, then multiple highway gates $y(1, \ldots, P)_t^{L+1}$ may be added and their outputs update the corresponding m and contribute to the cell value as in Equation (38) as follows:

$$c_t^{L+1} = f_t^{L+1} \odot c_{t-1}^{L+1} + i_t^{L+1} \odot j_t^{L+1} + d_t^{L+1} \odot c_t^L + \sum_{\alpha=1}^{P} y(\alpha)_t^{L+1} \odot m(\alpha)_t^{L+1}. \tag{38}$$

Multiple additional inputs based from previous LSTM layers may be added through multiples of the second highway gate, or depth gate, $d_t^{L+1}$ 1575. This may be extended for multiple highway inputs via multiplicities of $p_t^{L*}$ and $m_t^{L+1}$. According to one embodiment of the present system and method, different cell outputs from lower LSTM layers may be concatenated, and the concatenated vector may be passed through the highway gate 575. The present system and method controls the flow of information from the distant signal register 567 which provides $p_t^{L*}$ directly into the second cell activation register $c_t^{L+1}$ 545.

Figure 6:
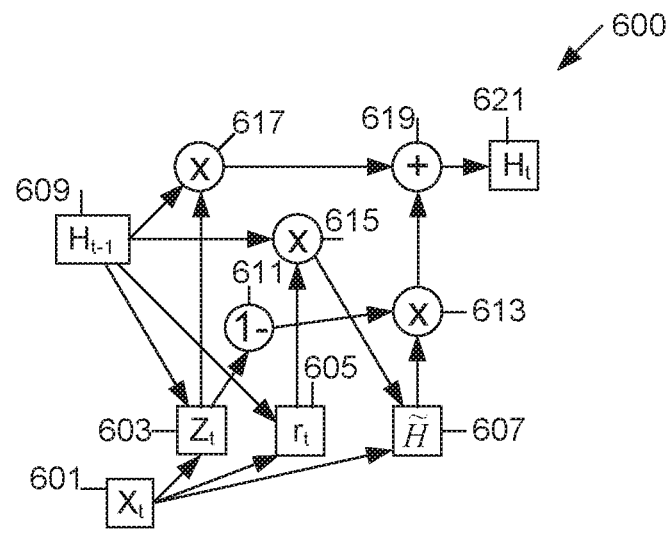
FIG. 6 is block diagram of a GRU network architecture.

FIG. 6 is block diagram of a GRU network architecture 600. A GRU may be defined by Equations (39)-(42) as follows:

$$r_t = \text{sigm}(W_{xr} x_t + W_{hr} h_{t-1} + b_r) \tag{39}$$

$$z_t = \text{sigm}(W_{xz} x_t + W_{hz} h_{t-1} + b_z) \tag{40}$$

$$\tilde{h}_t = \tanh(W_{xh}x_t + W_{hh}(r_t \odot h_{t-1}) + b_h) \quad (41)$$

$$h_t = z_t \odot h_{t-1} + (1-z_t) \odot \tilde{h}_t \quad (42)$$

Referring to FIG. 6, the GRU network architecture 600 in a layer (e.g., layer L+1) includes an input gate $x_t^{L+1}$ 601, an update gate $z_t^{L+1}$ 603, a reset gate $r_t^{L+1}$ 605, a candidate gate $\tilde{h}_t^{L+1}$ 607, a first output gate $h_{t-1}^{L+1}$ 609 to hold the output of a previous layer (e.g., layer L), and a second output gate $h_t^{L+1}$ 621.

The input gate $x_t^{L+1}$ 601 includes an output connected to a first input of each of the update gate $z_t^{L+1}$ 603, the reset gate $r_t^{L+1}$ 605, and the candidate gate $\tilde{h}_t^{L+1}$ 607. The first output gate $h_{t-1}^{L+1}$ 609 includes a first output connected to a second input of the update gate $z_t^{L+1}$ 603, a second output connected to a second input of the reset gate $r_t^{L+1}$ 605, a third output connected to a first input of a first elementwise product projection gate 617, and a fourth output connected to a first input of a second elementwise product projection gate 615. The update gate $z_t^{L+1}$ 603 includes a first output connected to a second input of the first elementwise product projection gate 617, and a second output connected to subtract from 1 function block 611. The reset gate $r_t^{L+1}$ 605 includes an output connected to a second input of the second elementwise product projection gate 615. The candidate gate $\tilde{h}_t^{L+1}$ 607 includes a second input connected to an output of the second elementwise product projection gate 615, and an output connected to a first input of a third elementwise product projection gate 613. The subtract from 1 function block 611 includes an output connected to a second input of the third elementwise product projection gate 613. The first elementwise product projection gate 617 includes an output connected to a first input of an elementwise adder 619. The elementwise added 619 includes a second input connected to an output of the third elementwise product projection gate 613, and an output connected to an input of the second output gate $h_t^{L+1}$ 621.

For a hybrid network, the above architectures for LSTM are also applicable to GRUs, for example, a hybrid CNN-GRU with an input highway. For the description below, a distant input $p_t^{L*}$ may be an initial input $x_t^0$ to a network.

Figure 7:
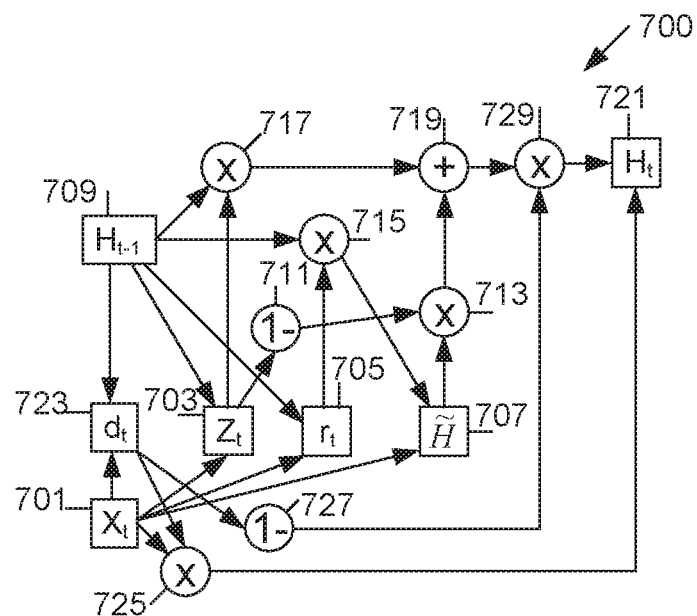
FIG. 7 is a block diagram of a GRU network architecture with highway connections (HGRU)

FIG. 7 is a block diagram of a GRU network architecture with highway connections (HGRU) 700.

Referring to FIG. 7, the HGRU network architecture 700 in a layer (e.g., layer L+1) includes an input gate $x_t^{L+1}$ 701, an update gate $z_t^{L+1}$ 703, a reset gate $r_t^{L+1}$ 705, a candidate gate $\tilde{h}_t^{L+1}$ 707, a first output gate $h_{t-1}^{L+1}$ 709 to hold the output of a previous layer (e.g., layer L), a second output gate $h_t^{L+1}$ 721, and a highway gate $d_t^{L+1}$ 723.

The input gate $x_t^{L+1}$ 701 includes a first output connected to a first input of each of the update gate $z_t^{L+1}$ 703, the reset gate $r_t^{L+1}$ 705, and the candidate gate $\tilde{h}_t^{L+1}$ 707, a second output connected to a first input of the highway gate $d_t^{L+1}$ 723, and a third output connected to a first input of a fourth elementwise product projection gate 725. The first output gate $h_{t-1}^{L+1}$ 709 includes a first output connected to a second input of the update gate $z_t^{L+1}$ 703, a second output connected to a second input of the reset gate $r_t^{L+1}$ 705, a third output connected to a first input of a first elementwise product projection gate 717, a fourth output connected to a first input of a second elementwise product projection gate 715, and a fifth output connected to an input of the highway gate $d_t^{L+1}$ 723. The update gate $z_t^{L+1}$ 703 includes a first output connected to a second input of the first elementwise product projection gate 717, and a second output connected to a first subtract from 1 function block 711. The reset gate $r_t^{L+1}$ 705 includes an output connected to a second input of the second elementwise product projection gate 715. The candidate gate $\tilde{h}_t^{L+1}$ 707 includes a second input connected to an output of the second elementwise product projection gate 715, and an output connected to a first input of a third elementwise product projection gate 713. The first subtract from 1 function block 711 includes an output connected to a second input of the third elementwise product projection gate 713. The first elementwise product projection gate 717 includes an output connected to a first input of an elementwise adder 719. The highway gate $d_t^{L+1}$ 723 includes a first output connected to a second input of the fourth elementwise product projection gate 725, and a second output connected to an input of a second subtract from 1 function block 727. A fifth elementwise product projection gate 729 includes an input connected to an output of the elementwise adder 719, a second input connected to an output of the second subtract from 1 function block 727, and an output connected to a first input of the second output gate $h_t^{L+1}$ 721. An output of the fourth elementwise product projection gate 725 is connected to a second input of the second output gate $h_t^{L+1}$ 721.

The highway gate 723 is within the HGRU network architecture 700 and controls the information from the current input. A HGRU network architecture 700 is a modified GRU that includes a connection from the input to the output through the highway gate 723 as in Equations (43)-(47) as follows:

$$r_t = \text{sigm}(W_{xr}x_t + W_{hr}h_{t-1} + b_r) \quad (43)$$

$$z_t = \text{sigm}(W_{xz}x_t + W_{hz}h_{t-1} + b_z) \quad (44)$$

$$\tilde{h}_t = \tanh(W_{xh}x_t + W_{hh}(r_t \odot h_{t-1}) + b_h) \quad (45)$$

$$d_t = \text{sigm}(W_{xd}x_t + W_{hd}h_{t-1} + b_d) \quad (46)$$

$$h_t = d_t \odot x_t + (1-d_t) \odot (z_t \odot h_{t-1} + (1-z_t) \odot \tilde{h}_t). \quad (47)$$

Figure 8:
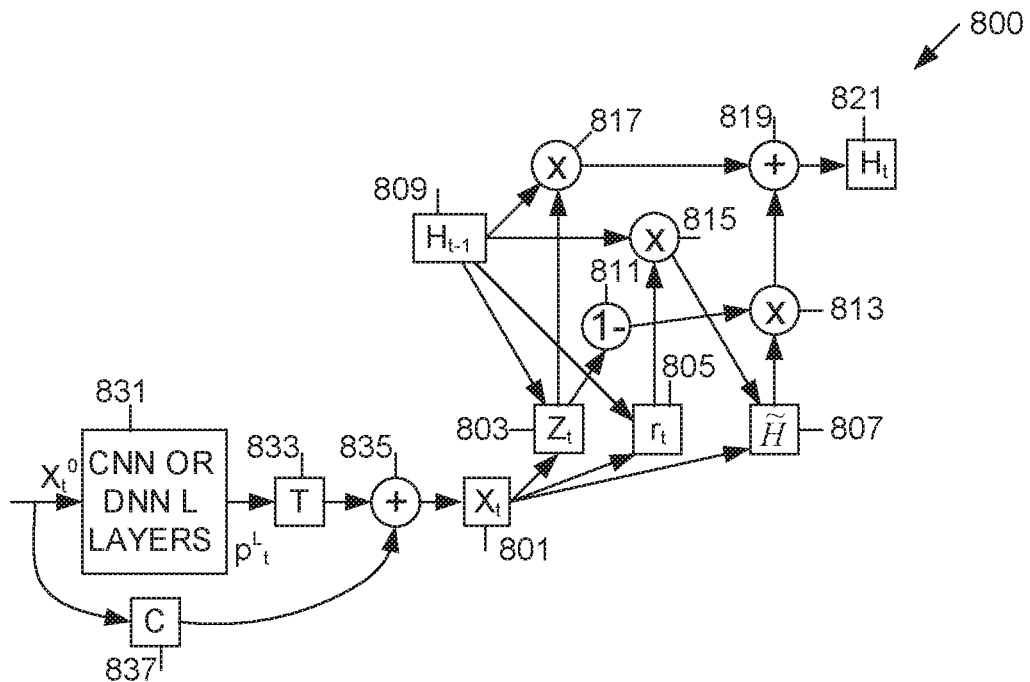
FIG. 8 is a block diagram of a combined hybrid CNN, or hybrid DNN, and GRU network architecture (hybrid CNN/DNN-GRU)

FIG. 8 is a block diagram of a combined hybrid CNN, or hybrid DNN, and GRU network architecture (hybrid CNN/DNN-GRU) 800.

Referring to FIG. 8, the hybrid CNN/DNN-GRU network architecture 800 in a layer (e.g., layer L+1) includes an input gate $x_t^{L+1}$ 801, an update gate $z_t^{L+1}$ 803, a reset gate $r_t^{L+1}$ 805, a candidate gate $\tilde{h}_t^{L+1}$ 807, a first output gate $h_{t-1}^{L+1}$ 809 to hold the output of a previous layer (e.g., layer L), a second output gate $h_t^{L+1}$ 821, a CNN or a DNN 831, a highway gate T 833, and a highway gate C 837.

The input gate $x_t^{L+1}$ 801 includes an output connected to a first input of each of the update gate $z_t^{L+1}$ 803, the reset gate $r_t^{L+1}$ 805, and the candidate gate $\tilde{h}_t^{L+1}$ 807. The first output gate $h_{t-1}^{L+1}$ 809 includes a first output connected to a second input of the update gate $z_t^{L+1}$ 803, a second output connected to a second input of the reset gate $r_t^{L+1}$ 805, a third output connected to a first input of a first elementwise product projection gate 817, and a fourth output connected to a first input of a second elementwise product projection gate 815. The update gate $z_t^{L+1}$ 803 includes a first output connected to a second input of the first elementwise product projection gate 817, and a second output connected to subtract from 1 function block 811. The reset gate $r_t^{L+1}$ 805 includes an output connected to a second input of the second elementwise product projection gate 815. The candidate gate $\tilde{h}_t^{L+1}$ 807 includes a second input connected to an output of the second elementwise product projection gate 815, and an output connected to a first input of a third elementwise product projection gate 813. The subtract from 1 function block 811 includes an output connected to a second input of the third elementwise product projection gate 813. The first elementwise product projection gate 817 includes an output connected to a first input of a first elementwise adder 819.

The first elementwise adder 819 includes a second input connected to an output of the third elementwise product projection gate 813, and an output connected to an input of the second output gate $h_t^{L+1}$ 821. The CNN or DNN 831 includes an input connected to an input of the highway gate C 837, and an output, where the highway gate C 837 includes an output connected to a first input of a second elementwise adder 835. The highway gate T 833 includes an input connected to the output of the CNN or DNN 831 and an output connected to a second input of the second elementwise adder 835, where the second elementwise adder 835 includes an output connected to an input of the input register $x_t^{L+1}$ 801.

The initial input $x_t^0$ to the input register $x_t^{L+1}$ 801 may be passed through a highway gate at an input of an LSTM layer as in Equations (48) and (49) as follows:

$$x_t^{L+1} = x_t^0 \cdot C(x, W_C) + p_t^L \cdot T(x, W_T) \tag{48}$$

$$T(x, W_T) = s(W_T x + b_T); \ C(x, W_C) = 1 - T(x, W_T), \tag{49}$$

where $b_T$ is initialized towards a negative value so that the network is biased towards carry over in a highway network.

A stacked DNN/CNN and LSTM network scheme and a hybrid DNN/CNN with LSTM networks and a residual connection scheme as described above for LSTM may also be modified for GRUs, where the highway gate T 833 and the highway gate C 837 may each be replaced by a simple addition to the residual network. The highway gate T 833 may be a transform gate while the highway gate C 837 may be a carry gate.

Figure 9:
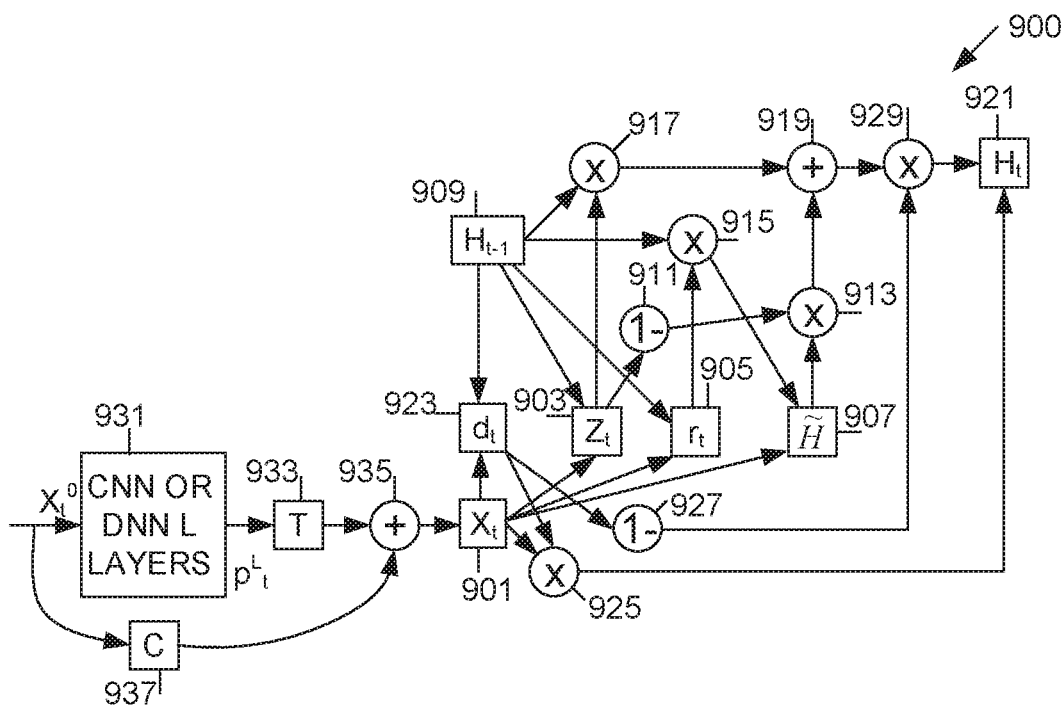
FIG. 9 is a block diagram of a combined hybrid CNN, or hybrid DNN, and HGRU network architecture (hybrid CNN/DNN-HGRU)

FIG. 9 is a block diagram of a combined hybrid CNN, or hybrid DNN, and HGRU network architecture (hybrid CNN/DNN-HGRU) 900. The hybrid CNN/DNN-HGRU network architecture 900 has an HGRU as a building block, and a distant input $p_t^{L^*}$ may be passed to the HGRU input via a carry gate of an input highway.

Referring to FIG. 9, the HGRU network architecture 900 in a layer (e.g., layer L+1) includes an input gate $x_t^{L+1}$ 901, an update gate $z_t^{L+1}$ 903, a reset gate $r_t^{L+1}$ 905, a candidate gate $\tilde{h}_t^{L+1}$ 907, a first output gate $h_{t-1}^{L+1}$ 909 to hold the output of a previous layer (e.g., layer L), a second output gate $h_t^{L+1}$ 921, a highway gate $d_t^{L+1}$ 923, a CNN or a DNN 931, a highway gate T 933, and a highway gate C 937.

The input gate $x_t^{L+1}$ 901 includes a first output connected to a first input of each of the update gate $z_t^{L+1}$ 903, the reset gate $r_t^{L+1}$ 905, and the candidate gate $\tilde{h}_t^{L+1}$ 907, a second output connected to a first input of the highway gate $d_t^{L+1}$ 923, and a third output connected to a first input of a fourth elementwise product projection gate 925. The first output gate $h_{t-1}^{L+1}$ 909 includes a first output connected to a second input of the update gate $z_t^{L+1}$ 903, a second output connected to a second input of the reset gate $r_t^{L+1}$ 905, a third output connected to a first input of a first elementwise product projection gate 917, a fourth output connected to a first input of a second elementwise product projection gate 915, and a fifth output connected to an input of the highway gate $d_t^{L+1}$ 923. The update gate $z_t^{L+1}$ 903 includes a first output connected to a second input of the first elementwise product projection gate 917, and a second output connected to a first subtract from 1 function block 911. The reset gate $r_t^{L+1}$ 905 includes an output connected to a second input of the second elementwise product projection gate 915. The candidate gate $\tilde{h}_t^{L+1}$ 907 includes a second input connected to an output of the second elementwise product projection gate 915, and an output connected to a first input of a third elementwise product projection gate 913. The first subtract from 1 function block 911 includes an output connected to a second input of the third elementwise product projection gate 913. The first elementwise product projection gate 917 includes an output connected to a first input of an elementwise adder 919. The highway gate $d_t^{L+1}$ 923 includes a first output connected to a second input of the fourth elementwise product projection gate 925, and a second output connected to an input of a second subtract from 1 function block 927. A fifth elementwise product projection gate 929 includes an input connected to an output of the elementwise adder 919, a second input connected to an output of the second subtract from 1 function block 927, and an output connected to a first input of the second output gate $h_t^{L+1}$ 921. An output of the fourth elementwise product projection gate 925 is connected to a second input of the second output gate $h_t^{L+1}$ 921. The CNN or DNN 931 includes an input connected to an input of the highway gate C 937, and an output, where the highway gate C 937 includes an output connected to a first input of a second elementwise adder 935. The highway gate T 933 includes an input connected to the output of the CNN or DNN 931 and an output connected to a second input of the second elementwise adder 935, where the second elementwise adder 935 includes an output connected to an input of the input register $x_t^{L+1}$ 901.

Figure 10:
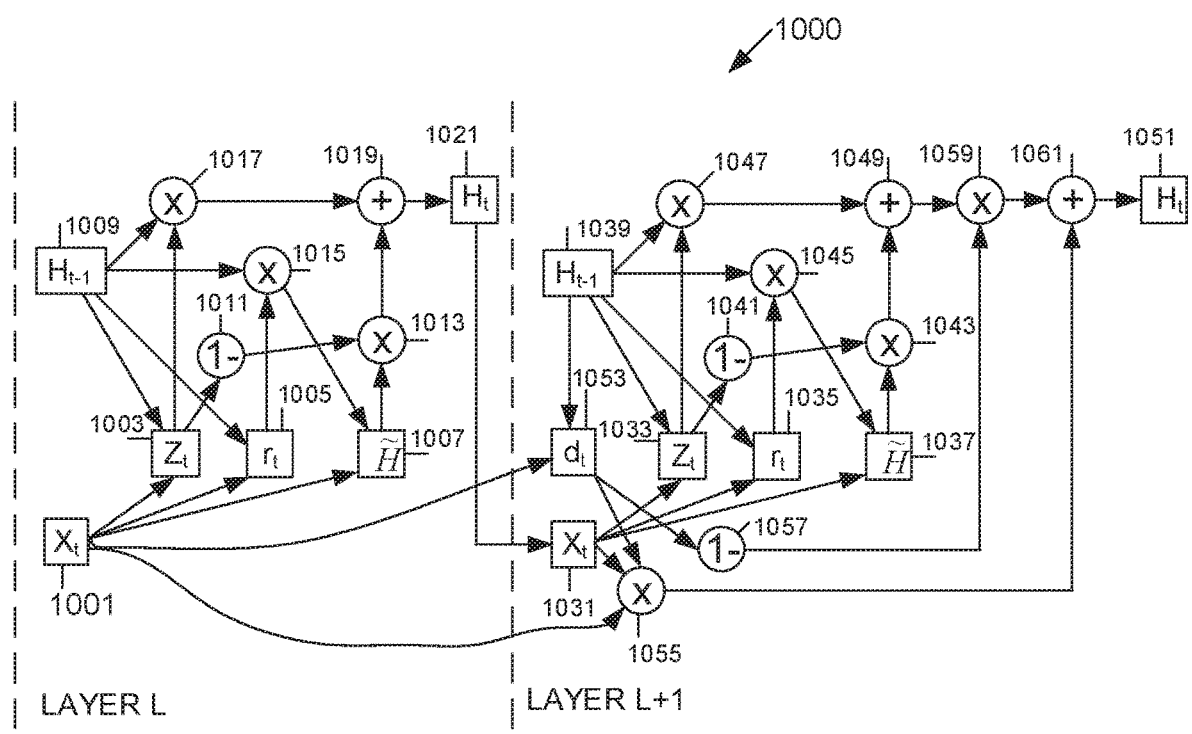
FIG. 10 is a block diagram of a combined GRU with an inter-highway connection and GRU network architecture with highway connections.

FIG. 10 is a block diagram of a combined GRU with an inter-highway connection and GRU network architecture with highway connections 1000. A single layer highway GRU may be modified such that a highway input is from a previous input of a previous GRU layer (and not from the current input of a current GRU layer). However, FIG. 10 may also be a block diagram of a combined HGRU with an inter-highway connection (H²GRU) and GRU network architecture with highway connections 1000. A single layer highway GRU may be modified such that a highway input is from a previous input of a previous GRU layer (and not from the current input of a current GRU layer). This passes distant information through a highway and allows a network to learn a simpler function of the previous input by driving weights of a stacked layer to zero.

Referring to FIG. 10, the combined GRU with an inter-highway connection and GRU network architecture with highway connections 1000 in a first layer (e.g., layer L) includes an input gate $x_t^L$ 1001, an update gate $z_t^L$ 1003, a reset gate $r_t^L$ 1005, a candidate gate $\tilde{h}_t^L$ 1007, a first output gate $h_{t-1}^L$ 1009 to hold the output of a previous layer (e.g., layer L-1), and a second output gate $h_t^L$ 1021.

The input gate $x_t^L$ 1001 includes a first output connected to a first input of each of the update gate $z_t^L$ 1003, the reset gate $r_t^L$ 1005, and the candidate gate $\tilde{h}_t^L$ 1007, a second output for connecting to a highway gate in another layer, and a third output for connecting to a elementwise product projection gate in another layer. The first output gate $h_{t-1}^L$ 1009 includes a first output connected to a second input of the update gate $z_t^L$ 1003, a second output connected to a second input of the reset gate $r_t^L$ 1005, a third output connected to a first input of a first elementwise product projection gate 1017, and a fourth output connected to a first input of a second elementwise product projection gate 1015. The update gate $z_t^L$ 1003 includes a first output connected to a second input of the first elementwise product projection gate 1017, and a second output connected to a subtract from 1 function block 1011. The reset gate $r_t^L$ 1005 includes an output connected to a second input of the second elementwise product projection gate 1015. The candidate gate $\tilde{h}_t^L$ 1007 includes a second input connected to an output of the second elementwise product projection gate 1015, and an output connected to a first input of a third elementwise product projection gate 1013. The subtract from 1 function block 1011 includes an output connected to a second input of the third elementwise product projection gate 1013. The first elementwise product projection gate 1017 includes an output connected to a first input of an elementwise adder 1019. The elementwise adder 1019 includes a second input connected to an output of the third elementwise product projection gate 1013, and an output connected to an input of the second output gate $h_t^L$ 1021. An output of the second output gate $h_t^L$ 1021 is connected to an input of an input gate of another layer.

The combined GRU with an inter-highway connection and GRU network architecture with highway connections 1000 in a second layer (e.g., layer L+1) includes an input register $x_t^{L+1}$ 1031, an update gate $z_t^{L+1}$ 1033, a reset gate $r_t^{L+1}$ 1035, a candidate gate $\tilde{h}_t^{L+1}$ 1037, a first output gate $h_{t-1}^{L+1}$ 1039 to hold the output of a previous layer (e.g., layer L), a second output gate $h_t^{L+1}$ 1051, and a highway gate $d_t^{L+1}$ 1053.

The input gate $x_t^{L+1}$ 1031 of the second layer includes an input connected to the output of the second output gate $h_t^L$ 1021 of the first layer, a first output connected to a first input of each of the update gate $z_t^{L+1}$ 1033, the reset gate $r_t^{L+1}$ 1035, and the candidate gate $\tilde{h}_t^{L+1}$ 1037, and a second output connected to a first input of a fourth elementwise product projection gate 1055. The first output gate $h_{t-1}^{L+1}$ 1039 includes a first output connected to a second input of the update gate $z_t^{L+1}$ 1033, a second output connected to a second input of the reset gate $r_t^{L+1}$ 1035, a third output connected to a first input of a first elementwise product projection gate 1047, a fourth output connected to a first input of a second elementwise product projection gate 1045, and a fifth output connected to a first input of the highway gate $d_t^{L+1}$ 1053. The update gate $z_t^{L+1}$ 1033 includes a first output connected to a second input of the first elementwise product projection gate 1047, and a second output connected to a first subtract from 1 function block 1041. The reset gate $r_t^{L+1}$ 1035 includes an output connected to a second input of the second elementwise product projection gate 1045. The candidate gate $\tilde{h}_t^{L+1}$ 1037 includes a second input connected to an output of the second elementwise product projection gate 1045, and an output connected to a first input of a third elementwise product projection gate 1043. The first subtract from 1 function block 1041 includes an output connected to a second input of the third elementwise product projection gate 1043. The first elementwise product projection gate 1047 includes an output connected to a first input of a first elementwise adder 1049. The highway gate $d_t^{L+1}$ 1053 includes a second input connected to the second output of the input gate $x_t^L$ 1001 of the first layer, a first output connected to a second input of the fourth elementwise product projection gate 1055, and a second output connected to an input of a second subtract from 1 function block 1057. A fifth elementwise product projection gate 1059 includes an input connected to an output of the first elementwise adder 1049, a second input connected to an output of the second subtract from 1 function block 1057, and an output connected to a first input of a second elementwise adder 1061. The fourth elementwise product projection gate 1055 includes a third input connected to the third output of the input gate $x_t^L$ 1001 of the first layer, and an output connected to a second input of the second elementwise adder 1061. The second elementwise adder 1061, includes an output connected to an input of the output gate $h_t^{L+1}$ 1051.

A combined HGRU with an inter-highway connection (H²GRU) and GRU network architecture with highway connections 1000 may be described as in Equations (50)-(55) as follows:

$$x_t^{L+1} = h_t^L \tag{50}$$

$$r_t^{L+1} = \text{sigm}(W_{xr}^{L+1} x_t^{L+1} + W_{hr}^{L+1} h_{t-1}^{L+1} + b_r^{L+1}) \tag{51}$$

$$z_t^{L+1} = \text{sigm}(W_{xz}^{L+1} x_t^{L+1} + W_{hz}^{L+1} h_{t-1}^{L+1} + b_z^{L+1}) \tag{52}$$

$$\tilde{h}_t^{L+1} = \tanh(W_{xh}^{L+1} x_t^{L+1} + W_{hh}^{L+1}(r_t^{L+1} \odot h_{t-1}^{L+1}) + b_h^{L+1}) \tag{53}$$

$$d_t^{L+1} = \text{sigm}(W_{xd}^{L+1} x_t^L + W_{hd}^{L+1} h_{t-1}^{L+1} + b_d^{L+1}) \tag{54}$$

$$h_t^{L+1} = d_t^{L+1} \odot x_t^L + (1 - d_t^{L+1}) \odot (z_t^{L+1} \odot h_{t-1}^{L+1} + (1 - z_t^{L+1}) \odot \tilde{h}_t^{L+1}). \tag{55}$$

Figure 11:
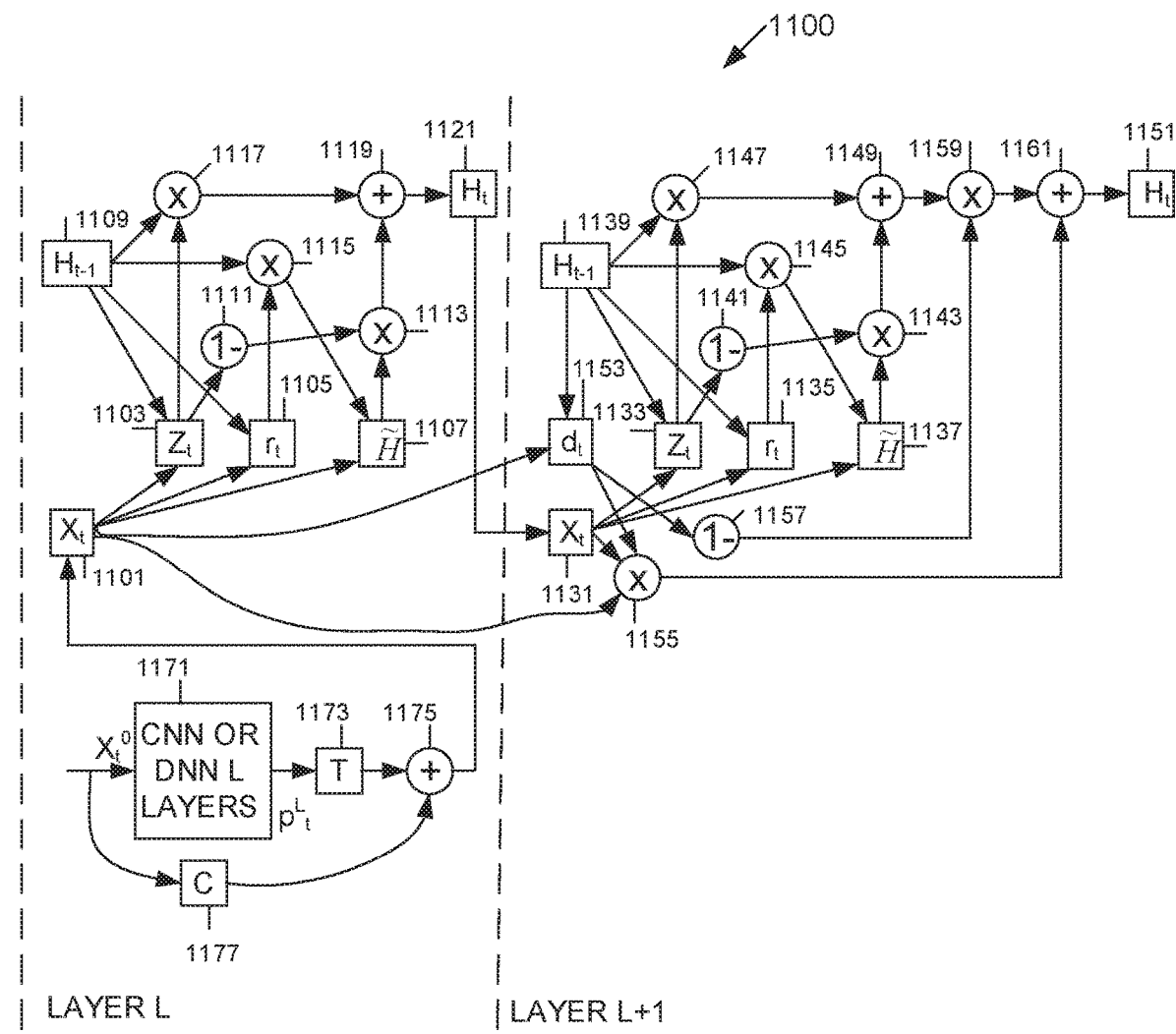
FIG. 11 is a block diagram of a combined hybrid CNN/DNN with a GRU and a GRU with highway connections.

FIG. 11 is a block diagram of a combined hybrid CNN/DNN with a GRU and a GRU with highway connections 1100. However, FIG. 11 may also be a block diagram of a combined hybrid CNN/DNN with an H²GRU and a GRU with highway connections 1100. The hybrid CNN/DNN with an H²GRU and a GRU with highway connections 1100 allows an input to a layer L to be from another highway connection over a feedforward CNN or DNN network.

Referring to FIG. 11, the combined hybrid CNN/DNN with a GRU and a GRU with highway connections 1100 in a first layer (e.g., layer L) includes an input gate $x_t^L$ 1101, an update gate $z_t^L$ 1103, a reset gate $r_t^L$ 1105, a candidate gate $\tilde{h}_t^L$ 1107, a first output gate $h_{t-1}^L$ 1109 to hold the output of a previous layer (e.g., layer L−1), a second output gate $h_t^L$ 1121, a CNN or a DNN 1171, a highway gate T 1173, and a highway gate C 1177.

The input gate $x_t^L$ 1101 includes an input, a first output connected to a first input of each of the update gate $z_t^L$ 1103, the reset gate $r_t^L$ 1105, and the candidate gate $\tilde{h}_t^L$ 1107, a second output for connecting to a highway gate in another layer, and a third output for connecting to a elementwise product projection gate in another layer. The first output gate $h_{t-1}^L$ 1109 includes a first output connected to a second input of the update gate $z_t^L$ 1103, a second output connected to a second input of the reset gate $r_t^L$ 1105, a third output connected to a first input of a first elementwise product projection gate 1117, and a fourth output connected to a first input of a second elementwise product projection gate 1115. The update gate $z_t^L$ 1103 includes a first output connected to a second input of the first elementwise product projection gate 1117, and a second output connected to a subtract from 1 function block 1111. The reset gate $r_t^L$ 1105 includes an output connected to a second input of the second elementwise product projection gate 1115. The candidate gate $\tilde{h}_t^L$ 1107 includes a second input connected to an output of the second elementwise product projection gate 1115, and an output connected to a first input of a third elementwise product projection gate 1113. The subtract from 1 function block 1111 includes an output connected to a second input of the third elementwise product projection gate 1113. The first elementwise product projection gate 1117 includes an output connected to a first input of an elementwise adder 1119. The elementwise adder 1119 includes a second input connected to an output of the third elementwise product projection gate 1113, and an output connected to an input of the second output gate $h_t^L$ 1121. An output of the second output gate $h_t^L$ 1121 is connected to an input of an input gate of another layer. The CNN or DNN 1171 includes an input connected to an input of the highway gate C 1177, and an output, where the highway gate C 1177 includes an output connected to a first input of a second elementwise adder 1175. The highway gate T 1173 includes an input connected to the output of the CNN or DNN 1171 and an output connected to a second input of the second elementwise adder 1175, where the second elementwise adder 1175 includes an output connected to the input of the input register $x_t^L$ 1101.

A combined hybrid CNN/DNN with an H²GRU and a GRU with highway connections 1100 in a second layer (e.g., layer L+1) includes an input gate $x_t^L$ 1131, an update gate $z_t^{L+1}$ 1133, a reset gate $r_t^{L+1}$ 1135, a candidate gate $\tilde{h}_t^{L+1}$ 1137, a first output gate $h_{t-1}^{L+1}$ 1139 to hold the output of a previous layer (e.g., layer L), a second output gate $h_t^{L+1}$ 1151, and a highway gate $d_t^{L+1}$ 1153.

The input gate $x_t^{L+1}$ 1131 of the second layer includes an input connected to the output of the second output gate $h_t^L$ 1121 of the first layer, a first output connected to a first input of each of the update gate $z_t^{L+1}$ 1133, the reset gate $r_t^{L+1}$ 1135, and the candidate gate $\tilde{h}_t^{L+1}$ 1137, and a second output connected to a first input of a fourth elementwise product projection gate 1155. The first output gate $h_{t-1}^{L+1}$ 1139 includes a first output connected to a second input of the update gate $z_t^{L+1}$ 1133, a second output connected to a second input of the reset gate $r_t^{L+1}$ 1135, a third output connected to a first input of a first elementwise product projection gate 1147, a fourth output connected to a first input of a second elementwise product projection gate 1145, and a fifth output connected to a first input of the highway gate $d_t^{L+1}$ 1153. The update gate $z_t^{L+1}$ 1133 includes a first output connected to a second input of the first elementwise product projection gate 1147, and a second output connected to a first subtract from 1 function block 1141. The reset gate $r_t^{L+1}$ 1135 includes an output connected to a second input of the second elementwise product projection gate 1145. The candidate gate $\tilde{h}_t^{L+1}$ 1137 includes a second input connected to an output of the second elementwise product projection gate 1145, and an output connected to a first input of a third elementwise product projection gate 1143. The first subtract from 1 function block 1141 includes an output connected to a second input of the third elementwise product projection gate 1143. The first elementwise product projection gate 1147 includes an output connected to a first input of a first elementwise adder 1149. The highway gate $d_t^{L+1}$ 1153 includes a second input connected to the second output of the input gate $x_t^L$ 1001 of the first layer, a first output connected to a second input of the fourth elementwise product projection gate 1155, and a second output connected to an input of a second subtract from 1 function block 1157. A fifth elementwise product projection gate 1159 includes an input connected to an output of the first elementwise adder 1149, a second input connected to an output of the second subtract from 1 function block 1157, and an output connected to a first input of a second elementwise adder 1161. The fourth elementwise product projection gate 1155 includes a third input connected to the third output of the input gate $x_t^L$ 1001 of the first layer, and an output connected to a second input of the second elementwise adder 1161. The second elementwise adder 1161, includes an output connected to an input of the output gate $h_t^{L+1}$ 1151.

Figure 12:
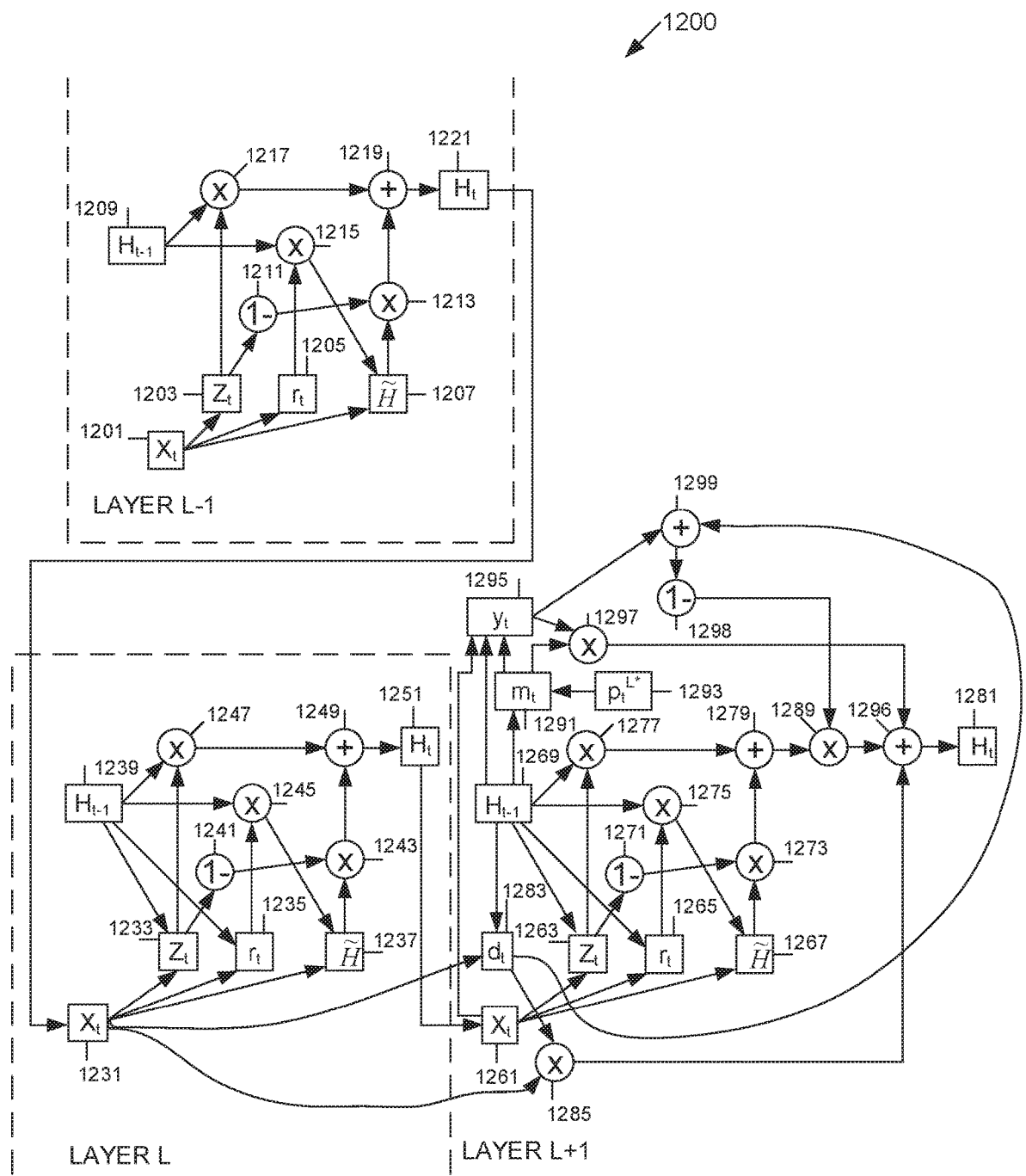
FIG. 12 is a block diagram of a combined GRU with an inter GRU and a GRU with multiple highway connections, according to an embodiment of the present disclosure.

FIG. 12 is a block diagram of a combined GRU with an inter GRU and a GRU with multiple highway connections 1200, according to an embodiment of the present disclosure. However, FIG. 12 may also be a block diagram of a combined GRU with an H²GRU and a GRU with multiple highway connections 1200, according to an embodiment of the present disclosure. A HGRU may be modified to take two highway connections at a given layer, one from a lower GRU layer, and one from a further distant signal, $p_t^{L^*}$.

Referring to FIG. 12, the combined GRU with a GRU and a GRU with multiple highway connections 1200 in a first layer (e.g., layer L−1) includes an input gate $x_t^{L-1}$ 1201, an update gate $z_t^{L-1}$ 1203, a reset gate $r_t^{L-1}$ 1205, a candidate gate $\tilde{h}_t^{L-1}$ 1207, a first output gate $h_{t-1}^{L-1}$ 1209 to hold the output of a previous layer (e.g., layer L−2), and a second output gate $h_t^{L-1}$ 1221.

The input gate $x_t^{L-1}$ 1201 in the first layer includes an output connected to a first input of each of the update gate $z_t^{L-1}$ 1203, the reset gate $r_t^{L-1}$ 1205, and the candidate gate $\tilde{h}_t^{L-1}$ 1207. The first output gate $h_{t-1}^{L-1}$ 1209 includes a first output connected to a first input of a first elementwise product projection gate 1217, and a second output connected to a first input of a second elementwise product projection gate 1215. The update gate $z_t^{L-1}$ 1203 includes a first output connected to a second input of the first elementwise product projection gate 1217, and a second output connected to a subtract from 1 function block 1211. The reset gate $r_t^{L-1}$ 1205 includes an output connected to a second input of the second elementwise product projection gate 1215. The candidate gate $\tilde{h}_t^{L-1}$ 1207 includes a second input connected to an output of the second elementwise product projection gate 1215, and an output connected to a first input of a third elementwise product projection gate 1213. The subtract from 1 function block 1211 includes an output connected to a second input of the third elementwise product projection gate 1213. The first elementwise product projection gate 1217 includes an output connected to a first input of an elementwise adder 1219. The elementwise adder 1219 includes a second input connected to an output of the third elementwise product projection gate 1213, and an output connected to an input of the second output gate $h_t^{L-1}$ 1221. An output of the second output gate $h_t^{L-1}$ 1221 is connected to an input of an input gate of another layer.

The combined GRU with a GRU and a GRU with multiple highway connections 1200 in a second layer (e.g., layer L) includes an input gate $x_t^L$ 1231, an update gate $z_t^L$ 1233, a reset gate $r_t^L$ 1235, a candidate gate $\tilde{h}_t^L$ 1237, a first output gate $h_{t-1}^L$ 1239 to hold the output of a previous layer (e.g., layer L−1), and a second output gate $h_t^L$ 1251.

The input gate $x_t^L$ 1231 in the second layer includes an input connected to the output of the the second output gate $h_t^L$ 1221 of layer L−1, a first output connected to a first input of each of the update gate $z_t^L$ 1233, the reset gate $r_t^L$ 1235, and the candidate gate $\tilde{h}_t^L$ 1237, a second output for connecting to a highway gate in another layer, and a third output for connecting to a elementwise product projection gate in another layer. The first output gate $h_{t-1}^L$ 1239 includes a first output connected to a second input of the update gate $z_t^L$ 1233, a second output connected to a second input of the reset gate $r_t^L$ 1235, a third output connected to a first input of a first elementwise product projection gate 1247, and a fourth output connected to a first input of a second elementwise product projection gate 1245. The update gate $z_t^L$ 1233 includes a first output connected to a second input of the first elementwise product projection gate 1247, and a second output connected to a subtract from 1 function block 1241. The reset gate $r_t^L$ 1235 includes an output connected to a second input of the second elementwise product projection gate 1245. The candidate gate $\tilde{h}_t^L$ 1237 includes a second input connected to an output of the second elementwise product projection gate 1245, and an output connected to a first input of a third elementwise product projection gate 1243. The subtract from 1 function block 1241 includes an output connected to a second input of the third elementwise product projection gate 1243. The first elementwise product projection gate 1247 includes an output connected to a first input of an elementwise adder 1249. The elementwise adder 1249 includes a second input connected to an output of the third elementwise product projection gate 1243, and an output connected to an input of the second output gate $h_t^L$ 1251. An output of the second output gate $h_t^L$ 1251 is connected to an input of an input gate of another layer.

The combined combined GRU with a GRU and a GRU with multiple highway connections 1200 in a third layer (e.g., layer L+1) includes an input gate $x_t^{L+1}$ 1261, an update gate $z_t^{L+1}$ 1263, a reset gate $r_t^{L+1}$ 1265, a candidate gate $\tilde{h}_t^{L+1}$ 1267, a first output gate $h_{t-1}^{L+1}$ 1269 to hold the output of a previous layer (e.g., layer L), a second output gate $h_t^{L+1}$ 1281, a highway gate $d_t^{L+1}$ 1283, a distant input gate 1291 including a first input for receiving a distant input 1293, and a highway gate for the distant input 1295.

The input gate $x_t^{L+1}$ 1261 in the third layer includes an input connected to the output of the second output gate $h_t^L$ 1251 of the second layer, a first output connected to a first input of each of the update gate $z_t^{L+1}$ 1263, the reset gate $r_t^{L+1}$ 1265, and the candidate gate $\tilde{h}_t^{L+1}$ 1267, and a second output connected to a first input of the highway gate of the distant input 1295. The first output gate $h_{t-1}^{L+1}$ 1269 includes a first output connected to a second input of the update gate $z_t^{L+1}$ 1263, a second output connected to a second input of the reset gate $r_t^{L+1}$ 1265, a third output connected to a first input of a first elementwise product projection gate 1277, a fourth output connected to a first input of a second elementwise product projection gate 1275, a fifth output connected to a first input of the highway gate $d_t^{L+1}$ 1283, a sixth output connected to a second input of the distant input gate 1291, and a seventh output connected to a second input of the highway gate for the distant input 1295. The update gate $z_t^{L+1}$ 1263 includes a first output connected to a second input of the first elementwise product projection gate 1277, and a second output connected to a first subtract from 1 function block 1271. The reset gate $r_t^{L+1}$ 1265 includes an output connected to a second input of the second elementwise product projection gate 1275. The candidate gate $\tilde{h}_t^{L+1}$ 1267 includes a second input connected to an output of the second elementwise product projection gate 1275, and an output connected to a first input of a third elementwise product projection gate 1273. The first subtract from 1 function block 1271 includes an output connected to a second input of the third elementwise product projection gate 1273. The first elementwise product projection gate 1277 includes an output connected to a first input of a first elementwise adder 1279. The highway gate $d_t^{L+1}$ 1283 includes a second input connected to the second output of the input gate $x_t^L$ 1231 of the second layer, a first output connected to a second input of the fourth elementwise product projection gate 1285, and a second output connected to a first input of a second elementwise adder 1299. The distant input gate 1291 includes a first output connected to a third input of the highway gate for the distant input 1295 and a second output connected to a first input of a sixth elementwise product projection gate 1297. The highway gate for the distant input 1295 includes a first output connected to a second input of the second elementwise adder 1299 and a second output connected to a second input of the sixth elementwise product projection gate 1297. The second elementwise adder 1299 includes an output connected to an input to the second subtract from 1 function block 1298. A fifth elementwise product projection gate 1289 includes a first input connected to an output of the first elementwise adder 1279, a second input connected to an output of the second subtract from 1 function block 1298, and an output connected to a first input of a third elementwise adder 1296.

The fourth elementwise product projection gate 1285 includes a second input connected to the third output of the input gate $x_t^L$ 1231 of the second layer, and an output connected to a second input of the third elementwise adder 1296. The third elementwise adder 1296, includes an output connected to an input of the second output gate $h_t^{L+1}$ 1281.

A recurrent operation with a distant input $p_t^{L*}$ may be described as in Equation (56) as follows:

$$m_t^{L+k} = \tanh(W_{pm}^{L+1} p_t^{L*} + W_{hm}^{L+1} h_{t-1}^{L+1} + b_m^{L+1}). \quad (56)$$

The highway gate for the distant input 1295, as a function of the distant input $p_t^{L*}$, a current input, and a current input state, may be described as in Equation (57) as follows:

$$y_t^{L+1} = \text{sigm}(W_{xy}^{L+1} x_t^{L+1} + W_{hy}^{L+1} h_{t-1}^{L+1} + W_{py}^{L+1} p_t^{L*} + b_y^{L+1}). \quad (57)$$

A gated recurrent information from a distant output may then be passed through a highway gate, together with that from a lower GRU layer. Various gates may be represented as in Table 1 as follows:

TABLE 1

| | |
|---|---|
| Reset gate | $r_t^{L+1} = \text{sigm}(W_{xr}^{L+1} x_t^{L+1} + W_{hr}^{L+1} h_{t-1}^{L+1} + b_r^{L+1})$ |
| Update gate | $z_t^{L+1} = \text{sigm}(W_{xz}^{L+1} x_t^{L+1} + W_{hz}^{L+1} h_{t-1}^{L+1} + b_z^{L+1})$ |
| Candidate gate | $\tilde{h}_t^{L+1} = \tanh(W_{xh}^{L+1} x_t^{L+1} + W_{hh}^{L+1} (r_t^{L+1} \odot h_{t-1}^{L+1}) + b_h^{L+1})$ |
| GRU highway gate | $d_t^{L+1} = \text{sigm}(W_{xd}^{L+1} x_t^L + W_{hd}^{L+1} h_{t-1}^{L+1} + b_d^{L+1})$ |
| Distant candidate gate | $m_t^{L+1} = \tanh(W_{pm}^{L+1} p_t^{L*} + W_{hm}^{L+1} h_{t-1}^{L+1} + b_m^{L+1})$ |
| Distant highway gate | $y_t^{L+1} = \text{sigm}(W_{xy}^{L+1} x_t^{L+1} + W_{hy}^{L+1} h_{t-1}^{L+1} + W_{my}^{L+1} m_t^{L+1} + b_y^{L+1})$ |
| Output gate | $h_t^{L+1} = d_t^{L+1} \odot x_t^L + y_t^{L+1} \odot m_t^{L+1} + (1 - d_t^{L+1} - y_t^{L+1}) \odot (z_t^{L+1} \odot h_{t-1}^{L+1}) + (1 - z_t^{L+1}) \odot \tilde{h}_t^{L+1})$ |

$m_t^{L+1}$ 1291 may be a recurrent operation added as a function of an additional distant input. $y_t^{L+1}$ 1295 may be a highway gate for a distant input as a function of the distant input $p_t^{L*}$, current input, and current input state. According to one embodiment, multiple y gates may be initiated in case of multiple connections from previous layers, which may be combined with multiple inter-GRU layer highway connections as well.

According to one embodiment, a recurrent network may be implemented as GRUs or LSTMs that control the flow of information into and from the recurrent network. An H²LSTM network architecture may provide multiple highway connections from multiple inputs coming from different types of layers. An H²LSTM network may further learn a simplified function of previous inputs by driving weights of extra deep layers to zero. An H²GRU may provide highway connections from previous GRU layers as well as other layers such as feedforward layers, rather than within only one GRU layer. A recurrent network allows highway connections in hybrid networks with both feedforward (fully connected or convolutional) and recurrent layers. Inner states of LSTM or GRU recurrent units still depend on current input and previous states only, and additional highway gates allow control of information from a distant input to the cell, after transformation of the distant input with an additional recurrent cell. This supplements the respective LSTM or GRU unit output with additional information about distant input which helps the learning process.

Figure 13:
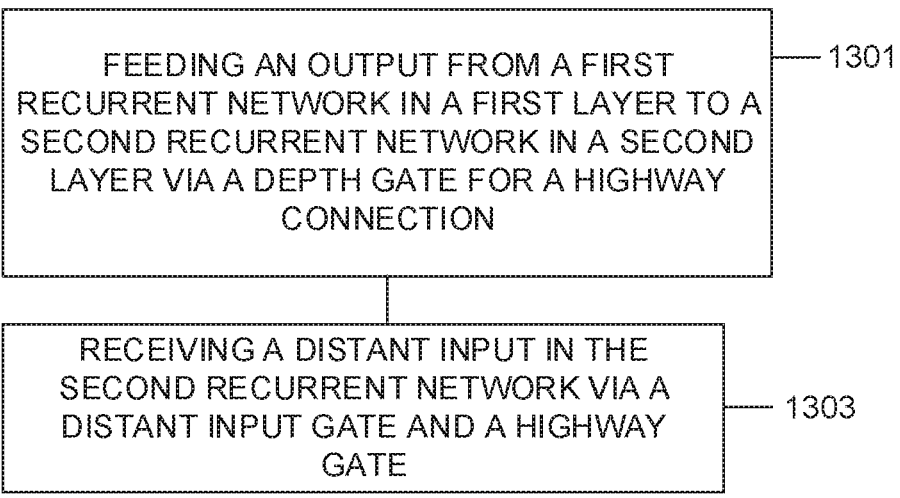
FIG. 13 is a flowchart of a method of a hybrid recurrent network with a highway connection, according to an embodiment of the present disclosure.

FIG. 13 is a flowchart of a method of a hybrid recurrent network with a highway connection, according to an embodiment of the present disclosure. For example, a method of a hybrid LSTM network architecture with highway connections (H²LSTM).

Referring to FIG. 13, the method includes feeding an output from a first recurrent network in a first layer to a second recurrent network in a second layer via a highway, or depth, gate for the highway connection at 1301.

At 1303, the method includes receiving a distant input in the second recurrent network via a distant input gate and a highway gate.

Figure 14:
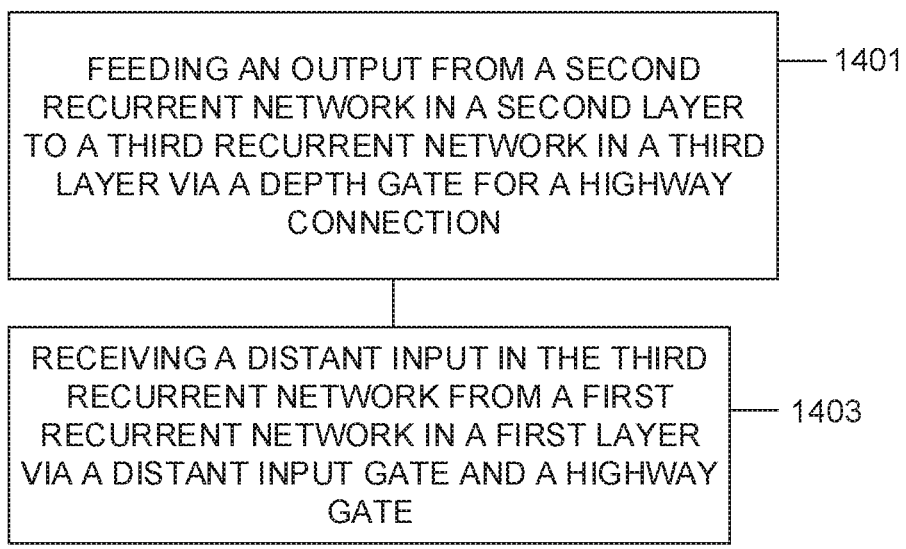
FIG. 14 is a flowchart of a method of a hybrid recurrent network with multiple highway connections, according to an embodiment of the present disclosure.

FIG. 14 is a flowchart of a method of a hybrid recurrent network with multiple highway connections, according to an embodiment of the present disclosure.

Referring to FIG. 14, the method includes feeding an output from a second recurrent network in a second layer to a third recurrent network in a third layer via a highway, or depth, gate for the highway connection, at 1401.

At 1403, the method includes receiving a distant input in the third recurrent network from a first recurrent network in a first layer via a distant input gate and a highway gate.

Figure 15:
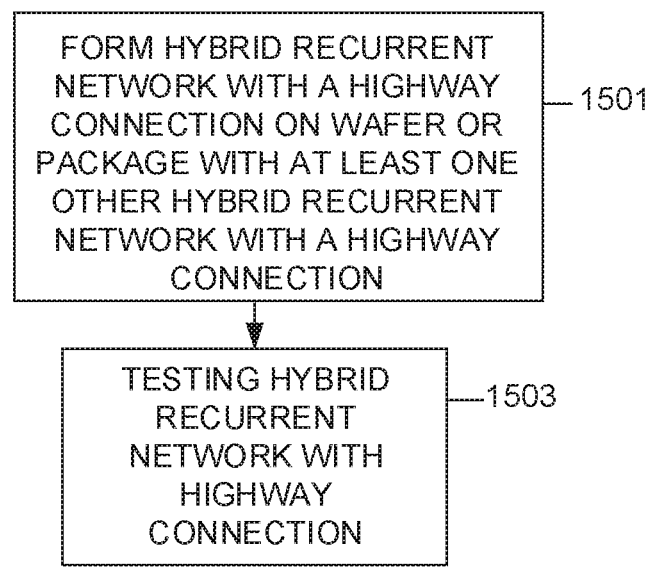
FIG. 15 is a flowchart of a method of manufacturing a hybrid recurrent network with a highway connection, according to an embodiment of the present disclosure.

FIG. 15 is a flowchart of a method of manufacturing a hybrid recurrent network with a highway connection, according to an embodiment of the present disclosure.

Referring to FIG. 15, the method, at 1501, the method includes forming the hybrid recurrent network with the highway connection as part of a wafer or package that includes at least one other hybrid recurrent network with a highway connection, wherein the hybrid recurrent network with a highway connection is configured to feed an output from a first recurrent network in a first layer to a second recurrent network in a second layer via a highway, or depth, gate for the highway connection, and receive a distant input in the second recurrent network via a distant input gate and a highway gate.

At 1503, the method includes testing the hybrid recurrent network with the highway connection, wherein testing the hybrid recurrent network with the highway connection comprises testing the hybrid recurrent network with the highway connection and the at least one other hybrid recurrent network with the highway connection using one or more electrical to optical converters, one or more optical splitters that split an optical signal into two or more optical signals, and one or more optical to electrical converters.

Figure 16:
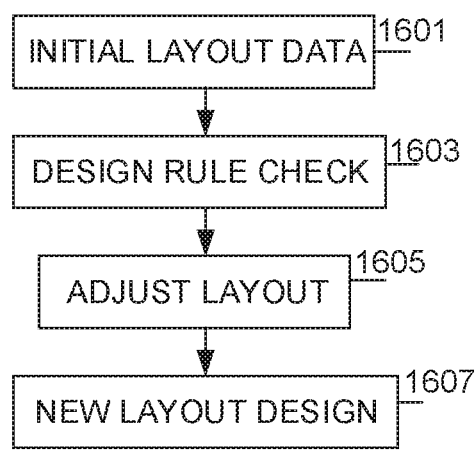
FIG. 16 is a flowchart of constructing an integrated circuit, according to an embodiment of the present disclosure.

FIG. 16 is a flowchart of constructing an integrated circuit, a method of manufacturing a hybrid recurrent network with a highway connection.

Referring to FIG. 16, the method, at 1601, constructs initial layout data. For example, the method may generate a mask layout for a set of features for a layer of the integrated circuit, wherein the mask layout includes standard cell library macros for one or more circuit features that include a hybrid recurrent network with a highway connection configured to feed an output from a first recurrent network in a first layer to a second recurrent network in a second layer via a highway, or depth gate for the highway connection, and receive a distant input in the second recurrent network via a distant input gate and a highway gate, and disregarding relative positions of the macros for compliance to layout design rules during the generation of the mask layout.

At 1603, the method includes performing a design rule check. For example, the method may check the relative positions of the macros for compliance to layout design rules after generating the mask layout.

At 1605, the method includes adjusting the layout. For example, the method, upon detection of noncompliance with the layout design rules by any of the macros, may modify the mask layout by modifying each of the noncompliant macros to comply with the layout design rules.

At 1607, the method includes generating a new layout design. For example, the method may generate a mask according to the modified mask layout with the set of features for the layer of the integrated circuit. Then, the integrated circuit layer according to the mask may be manufactured.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. An apparatus, comprising:
   an $n^{th}$ recurrent network in an $n^{th}$ layer, wherein n is a positive integer;
   an $(n+1)^{th}$ recurrent network in an $(n+1)^{th}$ layer connected to the $n^{th}$ recurrent network;
   a distant input gate connected to the $(n+1)^{th}$ recurrent network, wherein the distant input gate receives an input from a layer that is prior to and more distant than an $(n-1)^{th}$ layer connected to the $n^{th}$ layer;
   a first highway gate connected to the distant input gate and the $(n+1)^{th}$ recurrent network;
   a first elementwise product projection gate connected to the distant input gate, the first highway gate, and the $(n+1)^{th}$ recurrent network;
   a second highway gate connected to the $n^{th}$ recurrent network and the $(n+1)^{th}$ recurrent network; and
   a second elementwise product projection gate connected to the $n^{th}$ recurrent network, the second highway gate, and the $(n+1)^{th}$ recurrent network.

2. The apparatus of claim 1, wherein the $n^{th}$ recurrent network and the $(n+1)^{th}$ recurrent network are each one of a gated recurrent unit (GRU) and a long short term memory (LSTM).

3. The apparatus of claim 2, wherein the $n^{th}$ recurrent network is an LSTM comprising:
   a first cell activation register $c_{t-1}^{L}$ including an output;
   a first elementwise product projection gate including a first input connected to the output of the first cell activation register $c_{t-1}^{L}$, a second input, and an output;
   a first output gate $h_{t-1}^{L}$ including an output;
   an input register $x_{t}^{L}$ including an output;
   a forget gate $f_{t}^{L}$ including an input connected to the output of the first output gate $h_{t-1}^{L}$ and the output of the input register $x_{t}^{L}$, and an output connected to the second input of the first elementwise product projection gate;
   an input gate $i_{t}^{L}$ including an input connected to the output of the first output gate $h_{t-1}^{L}$ and the output of the input register $x_{t}^{L}$, and an output;
   a new input register $j_{t}^{L}$ including an input connected to the output of the first output gate $h_{t-1}^{L}$ and the output of the input register $x_{t}^{L}$, and an output;
   a cell output activation register $o_{t}^{L}$ including an input connected to the output of the first output gate $h_{t-1}^{L}$ and the output of the input register $x_{t}^{L}$, and an output;
   a second elementwise product projection gate including a first input connected to the output of the input gate $i_{t}^{L}$, a second input connected to the output of the new input register $j_{t}^{L}$, and an output;
   an adder including a first input connected to the output of the first elementwise product projection gate, a second input connected to the output of the second elementwise product projection gate, and an output;
a second cell activation register $c_t^L$ includes an input connected to the output of the adder, and an output;
a third elementwise product projection gate including a first input connected to the output of the second cell activation register $c_t^L$, a second input connected to the output of the cell output activation register $o_t^L$, and an output; and
a second output gate $h_t^L$ including an input connected to the output of the third elementwise product projection gate, and an output.

4. The apparatus of claim 2, wherein the $(n+1)^{th}$ recurrent network is an LSTM comprising:
a first cell activation register $c_{t-1}^{L+1}$ including a first output, a second output, and a third output;
a first elementwise product projection gate including a first input connected to the first output of the first cell activation register $c_{t-1}^{L+1}$, a second input, and an output;
a first output gate $h_{t-1}^{L+1}$ including an output;
an input register $x_t^{L+1}$ including an output;
a forget gate $f_t^{L+1}$ including an input connected to the output of the first output gate $h_{t-1}^{L+1}$ and the output of the input register $x_t^{L+1}$, and an output connected to the second input of the first elementwise product projection gate;
an input gate $i_t^{L+1}$ including an input connected to the output of the first output gate $h_{t-1}^{L+1}$ and the output of the input register $x_t^{L+1}$, and an output;
a new input register $j_t^{L+1}$ including an input connected to the output of the first output gate $h_{t-1}^{L+1}$ and the output of the input register $x_t^{L+1}$, and an output;
a cell output activation register $o_t^{L+1}$ including an input connected to the output of the first output gate $h_{t-1}^{L+1}$ and the output of the input register $x_t^{L+1}$, and an output;
a second elementwise product projection gate including a first input connected to the output of the input gate $i_t^{L+1}$, a second input connected to the output of the new input register $j_t^{L+1}$, and an output;
an adder including a first input connected to the output of the first elementwise product projection gate, a second input connected to the output of the second elementwise product projection gate, and an output;
a second cell activation register $c_t^{L+1}$ includes an input connected to the output of the adder, and an output;
a third elementwise product projection gate including a first input connected to the output of the second cell activation register $c_t^{L+1}$, a second input connected to the output of the cell output activation register $o_t^{L+1}$, and an output; and
a second output gate $h_t^{L+1}$ including an input connected to the output of the third elementwise product projection gate, and an output.

5. A method of a hybrid recurrent network with a highway connection, comprising:
feeding an output from an $n^{th}$ recurrent network in an $n^{th}$ layer to an $(n+1)^{th}$ recurrent network in an $(n+1)^{th}$ layer via a first highway gate for the highway connection, wherein n is a positive integer; and
receiving a distant input in the $(n+1)^{th}$ recurrent network via a distant input gate and a second highway gate, wherein the distant input gate receives an input from a layer that is prior to and more distant than an $(n-1)^{th}$ layer connected to the $n^{th}$ layer.

6. The method of claim 5, wherein the $n^{th}$ recurrent network and the $(n+1)^{th}$ recurrent network are each one of a gated recurrent unit (GRU) and a long short term memory (LSTM).

7. The method of claim 6, wherein the $n^{th}$ recurrent network is an LSTM comprising:
a first cell activation register $c_{t-1}^L$ including an output;
a first elementwise product projection gate including a first input connected to the output of the first cell activation register $c_{t-1}^L$, a second input, and an output;
a first output gate $h_{t-1}^L$ including an output;
an input register $x_t^L$ including an output;
a forget gate $f_t^L$ including an input connected to the output of the first output gate $h_{t-1}^L$ and the output of the input register $x_t^L$, and an output connected to the second input of the first elementwise product projection gate;
an input gate $i_t^L$ including an input connected to the output of the first output gate $h_{t-1}^L$ and the output of the input register $x_t^L$, and an output;
a new input register $j_t^L$ including an input connected to the output of the first output gate $h_{t-1}^L$ and the output of the input register $x_t^L$, and an output;
a cell output activation register $o_t^L$ including an input connected to the output of the first output gate $h_{t-1}^L$ and the output of the input register $x_t^L$, and an output;
a second elementwise product projection gate including a first input connected to the output of the input gate $i_t^L$, a second input connected to the output of the new input register $j_t^L$, and an output;
an adder including a first input connected to the output of the first elementwise product projection gate, a second input connected to the output of the second elementwise product projection gate, and an output;
a second cell activation register $c_t^L$ includes an input connected to the output of the adder, and an output;
a third elementwise product projection gate including a first input connected to the output of the second cell activation register $c_t^L$, a second input connected to the output of the cell output activation register $o_t^L$, and an output; and
a second output gate $h_t^L$ including an input connected to the output of the third elementwise product projection gate, and an output.

8. The method of claim 6, wherein the $(n+1)^{th}$ recurrent network is an LSTM comprising:
a first cell activation register $c_{t-1}^{L+1}$ including a first output, a second output, and a third output;
a first elementwise product projection gate including a first input connected to the first output of the first cell activation register $c_{t-1}^{L+1}$, a second input, and an output;
a first output gate $h_{t-1}^{L+1}$ including an output;
an input register $x_t^{L+1}$ including an output;
a forget gate $f_t^{L+1}$ including an input connected to the output of the first output gate $h_{t-1}^{L+1}$ and the output of the input register $x_t^{L+1}$, and an output connected to the second input of the first elementwise product projection gate;
an input gate $i_t^{L+1}$ including an input connected to the output of the first output gate $h_{t-1}^{L+1}$ and the output of the input register $x_t^{L+1}$, and an output;
a new input register $j_t^{L+1}$ including an input connected to the output of the first output gate $h_{t-1}^{L+1}$ and the output of the input register $x_t^{L+1}$, and an output;
a cell output activation register $o_t^{L+1}$ including an input connected to the output of the first output gate $h_{t-1}^{L+1}$ and the output of the input register $x_t^{L+1}$, and an output;

a second elementwise product projection gate including a first input connected to the output of the input gate $i_t^{L+1}$, a second input connected to the output of the new input register $j_t^{L+1}$, and an output;

an adder including a first input connected to the output of the first elementwise product projection gate, a second input connected to the output of the second elementwise product projection gate, and an output;

a second cell activation register $c_t^{L+1}$ includes an input connected to the output of the adder, and an output;

a third elementwise product projection gate including a first input connected to the output of the second cell activation register $c_t^{L+1}$, a second input connected to the output of the cell output activation register $o_t^{L+1}$, and an output; and a second output gate $h_t^{L+1}$ including an input connected to the output of the third elementwise product projection gate, and an output.

9. An apparatus, comprising:
an $n^{th}$ recurrent network in an $n^{th}$ layer, wherein n is a positive integer;
an $(n+1)^{th}$ recurrent network in an $(n+1)^{th}$ layer connected to the $n^{th}$ recurrent network;
an $(n+2)^{th}$ recurrent network in an $(n+2)^{th}$ layer connected to the $(n+1)^{th}$ recurrent network;
a distant input gate in the $(n+2)^{th}$ recurrent network connected to the $n^{th}$ recurrent network, wherein the distant input gate receives an input from a layer that is prior to and more distant than an $(n-1)^{th}$ layer connected to the $n^{th}$ layer;
a first highway gate in the $(n+2)^{th}$ recurrent network connected to the distant input gate;
a second highway gate in the $(n+2)^{th}$ recurrent network connected to the $(n+1)^{th}$ recurrent network; and
a first elementwise product projection gate in the $(n+2)^{th}$ recurrent network connected to the $(n+1)^{th}$ recurrent network and the second highway gate.

10. The apparatus of claim 9, wherein the $n^{th}$ recurrent network, the $(n+1)^{th}$ recurrent network, and the $(n+2)^{th}$ recurrent network are each one of a gated recurrent unit (GRU) and a long short term memory (LSTM).

11. The apparatus of claim 10, wherein the $n^{th}$ recurrent network is a GRU comprising:
an input gate $x_t^{L-1}$ including an output;
an update gate $z_t^{L-1}$ including an input connected to the output of the input gate $x_t^{L-1}$, a first output, and a second output;
a reset gate $r_t^{L-1}$ including an input connected to the output of the input gate $x_t^{L-1}$, and an output;
a candidate gate $\tilde{h}_t^{L-1}$ including a first input connected to the output of the input gate $x_t^{L-1}$, a second input, and an output;
a first output gate $h_{t-1}^{L-1}$ including a first output, and a second output;
a first elementwise product projection gate including a first input connected to the first output of the update gate $z_t^{L-1}$, a second input connected to the first output of the first output gate $h_{t-1}^{L-1}$, and an output;
a second elementwise product projection gate including a first input connected to the output of the reset gate $r_t^{L-1}$, a second input connected to the second output of the first output gate $h_{t-1}^{L-1}$, and an output connected to the second input of the candidate gate $\tilde{h}_t^{L-1}$;
a subtract from 1 function block including an input connected to the second output of the update gate $z_t^{L-1}$, and an output;

a third elementwise product projection gate including a first input connected to the output of the candidate gate $\tilde{h}_t^{L-1}$, a second input connected to the output of the subtract from 1 function block, and an output;
an adder including a first input connected to the output of the first elementwise product projection gate, a second input connected to the output of the third elementwise product projection gate, and an output; and
a second output gate $h_t^{L-1}$ including an input connected to the output of the adder, and an output.

12. The apparatus of claim 10, wherein the $(n+1)^{th}$ recurring network is a GRU comprising:
an input gate $x_t^L$ including an input connected to the output of the output gate $h_t^{L-1}$ of the $n^{th}$ recurring network, a first output, a second output, and a third output;
an update gate $z_t^L$ including a first input connected to the first output of the input gate $x_t^L$, a second input, a first output, and a second output;
a reset gate $r_t^L$ including a first input connected to the first output of the input gate $x_t^L$, a second input, and an output;
a candidate gate $\tilde{h}_t^L$ including a first input connected to the first output of the input gate $x_t^L$, a second input, and an output;
a first output gate $h_{t-1}^L$ including a first output connected to the input of the update gate $z_t^L$, a second output connected to the input of the reset gate $r_t^L$, a third output, and a fourth output;
a first elementwise product projection gate including a first input connected to the first output of the update gate $z_t^L$, a second input connected to the third output of the first output gate $h_{t-1}^L$, and an output;
a second elementwise product projection gate including a first input connected to the output of the reset gate $r_t^L$, a second input connected to the fourth output of the first output gate $h_{t-1}^L$, and an output connected to the input of the candidate gate $\tilde{h}_t^L$;
a subtract from 1 function block including an input connected to the output of the update gate $z_t^L$, and an output;
a third elementwise product projection gate including a first input connected to the output of the candidate gate $\tilde{h}_t^L$, a second input connected to the output of the subtract from 1 function block, and an output;
an adder including a first input connected to the output of the first elementwise product projection gate, a second input connected to the output of the third elementwise product projection gate, and an output; and
a second output gate $h_t^L$ including an input connected to the output of the adder, and an output.

13. The apparatus of claim 10, wherein the $(n+2)^{th}$ recurrent network is a GRU with multiple highway connections comprising:
an input gate $x_t^{L+1}$ including an input connected to the output of the output gate $h_t^L$ of the $(n+1)^{th}$ recurring network, a first output, and a second output;
an update gate $z_t^{L+1}$ including a first input connected to the first output of the input gate $x_t^{L+1}$, a second input, a first output, and a second output;
a reset gate $r_t^{L+1}$ including a first input connected to the first output of the input gate $x_t^{L+1}$, a second input, and an output;
a candidate gate $\tilde{h}_t^{L+1}$ including a first input connected to the first output of the input gate $x_t^{L+1}$, a second input, and an output;

a first output gate $h_{t-1}^{L+1}$ including a first output connected to the input of the update gate $z_t^{L+1}$, a second output connected to the input of the reset gate $r_t^{L+1}$, a third output, a fourth output, a fifth output, a sixth output, and a seventh output;

a third highway gate $d_t^{L+1}$ including a first input connected to the output of the input gate $x_t^L$ of the $(n+1)^{th}$ recurring network, a second input connected to the fifth output of the first output gate $h_{t-1}^{L+1}$, a first output, and a second output;

a first elementwise product projection gate including a first input connected to the first output of the update gate $z_t^{L+1}$, a second input connected to the third output of the first output gate $h_{t-1}^{L+1}$, and an output;

a second elementwise product projection gate including a first input connected to the output of the reset gate $r_t^{L+1}$, a second input connected to the fourth output of the first output gate $h_{t-1}^{L+1}$, and an output connected to the input of the candidate gate $\tilde{h}_t^{L+1}$;

a first subtract from 1 function block including an input connected to the output of the update gate $z_t^{L+1}$, and an output;

a third elementwise product projection gate including a first input connected to the output of the candidate gate $\tilde{h}_t^{L+1}$, a second input connected to the output of the first subtract from 1 function block, and an output;

a first adder including a first input connected to the output of the first elementwise product projection gate, a second input connected to the output of the third elementwise product projection gate, and an output;

a fourth elementwise product projection gate including a first input connected to the third output of the input gate $x_t^L$ of the $(n+1)^{th}$ recurring network, a second input connected to the first output of the third highway gate $d_t^{L+1}$, and an output;

a distant input gate $m_t$ including a first input connected to the sixth output of the first output gate $h_{t-1}^{L+1}$, a second input for receiving a distant input, a first output, and a second output;

a fourth highway gate $y_t$ including a first input connected to the output of the input gate $x_t^{L+1}$, a second input connected to the seventh output of the first output gate $h_{t-1}^{L+1}$, a third input connected to the first output of the distant input gate $m_t$, a first output, and a second output;

a fifth elementwise product projection gate including a first input connected to the output of the distant input gate $m_t$, a second input connected to the first output of the fourth highway gate $y_t$, and an output;

a second adder including a first input connected to the output of the third highway gate $d_t^{L+1}$, a second input connected to the output of the fourth highway gate $y_t$, and an output;

a second subtract from 1 function block including an input connected to the output of the adder, and an output;

a sixth elementwise product projection gate including a first input connected to the output of the first adder, a second input connected to the output of the subtract from 1 function block, and an output;

a third adder including a first input connected to the output of the fourth elementwise product projection gate, a second input connected to the output of the fifth elementwise product projection gate, a third input connected to the output of the sixth elementwise product projection gate, and an output; and a second output gate $h_t^{L+1}$ including an input connected to the output of the third adder.

14. A method of a hybrid recurrent network with multiple highway connections, comprising:
   feeding an output from an $(n+1)^{th}$ recurrent network in an $(n+1)^{th}$ layer to an $(n+2)^{th}$ recurrent network in an $(n+2)^{th}$ layer via a first highway gate for the highway connection, wherein n is a positive integer; and
   receiving a distant input in the $(n+2)^{th}$ recurrent network from an $n^{th}$ recurrent network in an $n^{th}$ layer via a distant input gate and a second highway gate, wherein the distant input gate receives an input from a layer that is prior to and more distant than an $(n-1)^{th}$ layer connected to the $n^{th}$ layer.

15. The method of claim 14, wherein the $n^{th}$ recurrent network, the $(n+1)^{th}$ recurrent network, and the $(n+2)^{th}$ recurrent network are each one of a gated recurrent unit (GRU) and a long short term memory (LSTM).

16. The method of claim 15, wherein the $n^{th}$ recurrent network is a GRU comprising:
   an input gate $x_t^{L-1}$ including an output;
   an update gate $z_t^{L-1}$ including an input connected to the output of the input gate $x_t^{L-1}$, a first output, and a second output;
   a reset gate $r_t^{L-1}$ including an input connected to the output of the input gate $x_t^{L-1}$, and an output;
   a candidate gate $\tilde{h}_t^{L-1}$ including a first input connected to the output of the input gate $x_t^{L-1}$, a second input, and an output;
   a first output gate $h_{t-1}^{L-1}$ including a first output, and a second output;
   a first elementwise product projection gate including a first input connected to the first output of the update gate $z_t^{L-1}$, a second input connected to the first output of the first output gate $h_{t-1}^{L-1}$, and an output;
   a second elementwise product projection gate including a first input connected to the output of the reset gate $r_t^{L-1}$, a second input connected to the output of the first output gate $h_{t-1}^{L-1}$, and an output connected to the input of the candidate gate $\tilde{h}_t^{L-1}$;
   a subtract from 1 function block including an input connected to the output of the update gate $z_t^{L-1}$, and an output;
   a third elementwise product projection gate including a first input connected to the output of the candidate gate $\tilde{h}_t^{L-1}$, a second input connected to the output of the subtract from 1 function block, and an output;
   an adder including a first input connected to the output of the first elementwise product projection gate, a second input connected to the output of the third elementwise product projection gate, and an output; and
   a second output gate $h_t^{L-1}$ including an input connected to the output of the adder, and an output.

17. The method of claim 15, wherein the $(n+1)^{th}$ recurring network is a GRU comprising:
   an input gate $x_t^L$ including an input connected to the output of the output gate $h_t^{L-1}$ of the $n^{th}$ recurring network, a first output, a second output, and a third output;
   an update gate $z_t^L$ including a first input connected to the first output of the input gate $x_t^L$, a second input, a first output, and a second output;
   a reset gate $r_t^L$ including a first input connected to the first output of the input gate $x_t^L$ a second input, and an output;
   a candidate gate $\tilde{h}_t^L$ including a first input connected to the first output of the input gate $x_t^L$, a second input, and an output;

a first output gate $h_{t-1}^L$ including a first output connected to the input of the update gate $z_t^L$, a second output connected to the input of the reset gate $r_t^L$, a third output, and a fourth output;

a first elementwise product projection gate including a first input connected to the first output of the update gate $z_t^L$, a second input connected to the third output of the first output gate $h_{t-1}^L$, and an output;

a second elementwise product projection gate including a first input connected to the output of the reset gate $r_t^L$, a second input connected to the fourth output of the first output gate $h_{t-1}^L$, and an output connected to the input of the candidate gate $\tilde{h}_t^L$;

a subtract from 1 function block including an input connected to the output of the update gate $z_t^L$, and an output;

a third elementwise product projection gate including a first input connected to the output of the candidate gate $\tilde{h}_t^L$, a second input connected to the output of the subtract from 1 function block, and an output;

an adder including a first input connected to the output of the first elementwise product projection gate, a second input connected to the output of the third elementwise product projection gate, and an output; and a second output gate $h_t^L$ including an input connected to the output of the adder, and an output.

18. The method of claim 15, wherein the $(n+2)^{th}$ recurrent network is a GRU with multiple highway connections comprising:

an input gate $x_t^{L+1}$ including an input connected to the output of the output gate $h_t^L$ of the $(n+1)^{th}$ recurring network, a first output, and a second output;

an update gate $z_t^{L+1}$ including a first input connected to the first output of the input gate $x_t^{L+1}$, a second input, a first output, and a second output;

a reset gate $r_t^{L+1}$ including a first input connected to the first output of the input gate $x_t^{L+1}$, a second input, and an output;

a candidate gate $\tilde{h}_t^{L+1}$ including a first input connected to the first output of the input gate $x_t^{L+1}$, a second input, and an output;

a first output gate $h_{t-1}^{L+1}$ including a first output connected to the input of the update gate $z_t^{L+1}$, a second output connected to the input of the reset gate $r_t^{L+1}$, a third output, a fourth output, a fifth output, a sixth output, and a seventh output;

a third highway gate $d_t^{L+1}$ including a first input connected to the output of the input gate $x_t^L$ of the $(n+1)^{th}$ recurring network, a second input connected to the fifth output of the first output gate $h_{t-1}^{L+1}$, a first output, and a second output;

a first elementwise product projection gate including a first input connected to the first output of the update gate $z_t^{L+1}$, a second input connected to the third output of the first output gate $h_{t-1}^{L+1}$, and an output;

a second elementwise product projection gate including a first input connected to the output of the reset gate $r_t^{L+1}$, a second input connected to the fourth output of the first output gate $h_{t-1}^{L+1}$, and an output connected to the input of the candidate gate $\tilde{h}_t^{L+1}$;

a first subtract from 1 function block including an input connected to the output of the update gate $z_t^{L+1}$, and an output;

a third elementwise product projection gate including a first input connected to the output of the candidate gate $\tilde{h}_t^{L+1}$, a second input connected to the output of the first subtract from 1 function block, and an output;

a first adder including a first input connected to the output of the first elementwise product projection gate, a second input connected to the output of the third elementwise product projection gate, and an output;

a fourth elementwise product projection gate including a first input connected to the third output of the input gate $x_t^L$ of the $(n+1)^{th}$ recurring network, a second input connected to the first output of the third highway gate $d_t^{L+1}$, and an output;

a distant input gate $m_t$ including a first input connected to the sixth output of the first output gate $h_{t-1}^{L+1}$, a second input for receiving a distant input, a first output, and a second output;

a fourth highway gate $y_t$ including a first input connected to the output of the input gate $x_t^{L+1}$, a second input connected to the seventh output of the first output gate $h_{t-1}^{L+1}$ a third input connected to the first output of the distant input gate $m_t$, a first output, and a second output;

a fifth elementwise product projection gate including a first input connected to the output of the distant input gate $m_t$, a second input connected to the first output of the fourth highway gate $y_t$, and an output;

a second adder including a first input connected to the output of the third highway gate $d_t^{L+1}$, a second input connected to the output of the fourth highway gate $y_t$, and an output;

a second subtract from 1 function block including an input connected to the output of the adder, and an output;

a sixth elementwise product projection gate including a first input connected to the output of the first adder, a second input connected to the output of the subtract from 1 function block, and an output;

a third adder including a first input connected to the output of the fourth elementwise product projection gate, a second input connected to the output of the fifth elementwise product projection gate, a third input connected to the output of the sixth elementwise product projection gate, and an output; and a second output gate $h_t^{L+1}$ including an input connected to the output of the third adder.

19. A method of manufacturing a hybrid recurrent network with a highway connection, comprising:

forming the hybrid recurrent network with the highway connection as part of a wafer or package that includes at least one other hybrid recurrent network with a highway connection, wherein the hybrid recurrent network with a highway connection is configured to feed an output from an $n^{th}$ recurrent network in an $n^{th}$ layer to an $(n+1)^{th}$ recurrent network in an $(n+1)^{th}$ layer via a first highway gate for the highway connection, and receive a distant input in the $(n+1)^{th}$ recurrent network via a distant input gate and a second highway gate, wherein the distant input is from a layer that is prior to and more distant than an $(n-1)^{th}$ layer connected to the $n^{th}$ layer, wherein n is a positive integer; and testing the hybrid recurrent network with the highway connection, wherein testing the hybrid recurrent network with the highway connection comprises testing the hybrid recurrent network with the highway connection and the at least one other hybrid recurrent network with the highway connection using one or more electrical to optical converters, one or more optical splitters that split an optical signal into two or more optical signals, and one or more optical to electrical converters.

20. A method of constructing an integrated circuit, comprising:
- generating a mask layout for a set of features for a layer of the integrated circuit, wherein the mask layout includes standard cell library macros for one or more circuit features that include a hybrid recurrent network with a highway connection configured to feed an output from an $n^{th}$ recurrent network in an $n^{th}$ layer to an $(n+1)^{th}$ recurrent network in an $(n+1)^{th}$ layer via a first highway gate for the highway connection, and receive a distant input in the $(n+1)^{th}$ recurrent network via a distant input gate and a second highway gate, wherein the distant input is from a layer that is prior to and more distant than an $(n-1)^{th}$ layer connected to the $n^{th}$ layer, wherein n is a positive integer;
- disregarding relative positions of the macros for compliance to layout design rules during the generation of the mask layout;
- checking the relative positions of the macros for compliance to layout design rules after generating the mask layout;
- upon detection of noncompliance with the layout design rules by any of the macros, modifying the mask layout by modifying each of the noncompliant macros to comply with the layout design rules;
- generating a mask according to the modified mask layout with the set of features for the layer of the integrated circuit; and
- manufacturing the integrated circuit layer according to the mask.

* * * * *